(12) United States Patent
Hasegawa

(10) Patent No.: US 8,218,863 B2
(45) Date of Patent: Jul. 10, 2012

(54) IMAGE PROCESSING APPARATUS, IMAGE PROCESSING METHOD AND IMAGE PROCESSING MEANS

(75) Inventor: Fumihiro Hasegawa, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 842 days.

(21) Appl. No.: 12/356,586

(22) Filed: Jan. 21, 2009

(65) Prior Publication Data

US 2009/0190830 A1    Jul. 30, 2009

(30) Foreign Application Priority Data

Jan. 30, 2008  (JP) ................. 2008-019724

(51) Int. Cl.
*G06K 9/00* (2006.01)
(52) U.S. Cl. ........ 382/165; 382/176; 382/192; 358/1.15
(58) Field of Classification Search .......... 382/165, 382/176, 192; 358/1.15
See application file for complete search history.

(56) References Cited

U.S. PATENT DOCUMENTS

| | | | |
|---|---|---|---|
| 5,613,016 | A | 3/1997 | Saitoh |
| 6,141,444 | A | 10/2000 | Hasegawa |
| 6,865,290 | B2 | 3/2005 | Kohchi |
| 2003/0002060 | A1 | 1/2003 | Yokoyama et al. |
| 2005/0180645 | A1 | 8/2005 | Hasegawa et al. |
| 2006/0170979 | A1 | 8/2006 | Hasegawa et al. |
| 2006/0171595 | A1 | 8/2006 | Hasegawa et al. |
| 2007/0025627 | A1 | 2/2007 | Hasegawa et al. |
| 2007/0097403 | A1 | 5/2007 | Miyazawa et al. |
| 2007/0154112 | A1 | 7/2007 | Tanaka |
| 2007/0230825 | A1 | 10/2007 | Hasegawa et al. |

FOREIGN PATENT DOCUMENTS

| | | | |
|---|---|---|---|
| JP | 61-015465 | * | 1/1986 |
| JP | 06-020092 | | 1/1994 |
| JP | 06-337926 | | 12/1994 |
| JP | 06-339019 | | 12/1994 |
| JP | 2001-297303 | | 10/2001 |
| JP | 2002-015323 | | 1/2002 |
| JP | 2002-209084 | | 7/2002 |
| JP | 2004-038530 | | 2/2004 |
| JP | 2004-062459 | | 2/2004 |
| JP | 2004-110434 | | 4/2004 |
| JP | 2004-297617 | | 10/2004 |
| JP | 2005-317042 | | 11/2005 |
| JP | 2006-092206 | | 4/2006 |
| JP | 2006-128987 | | 5/2006 |

(Continued)

OTHER PUBLICATIONS

Saito, JP06-020092-Eng which is the english version of JP06-020092 and translated by machine.*

(Continued)

*Primary Examiner* — Samir Ahmed
*Assistant Examiner* — Ruiping Li
(74) *Attorney, Agent, or Firm* — IPUSA, PLLC

(57) ABSTRACT

An image processing apparatus which extracts, from image data, drawing-photograph pixels forming a drawing or a photograph, the image processing apparatus including a pixel value replacement unit configured to replace pixel values of image data with plural representative pixel values; a candidate region extraction unit configured to extract plural candidate regions; a feature value acquisition unit configured to acquire a feature value indicating a degree of contained symbol pixels forming symbols; a feature value determination units.

14 Claims, 32 Drawing Sheets

FOREIGN PATENT DOCUMENTS

| | | |
|---|---|---|
| JP | 2007-183742 | 7/2007 |
| JP | 2007-221340 | 8/2007 |
| WO | WO 00/62243 | 10/2000 |

OTHER PUBLICATIONS

Yamamoto, JP2004-062459-Eng which is the english version of JP2004-062459 and translated by machine.*

Katsuyama, JP2005-317042-Eng which is the english version of JP2005-317042 and translated by machine.*

Tanaka, JP2007-183742-Eng which is the english version of JP2007-183742 and translated by machine.*

Kawachi: JP06-337926-Eng which is the english version of JP06-337926 and translated by machine.*

Maekawai: JP2007-221340-Eng which is the english version of JP2007-221340 and translated by machine.*

Goto: JP2004-297617-Eng which is the english version of JP2004-297617 and translated by machine.*

Yokoyama et al: JP2002-209084-Eng which is the english version of JP2002-209084 and translated by machine.*

Japanese Office Action dated Oct. 11, 2011.

* cited by examiner

BLACK AND THE OTHER COLORS

GREEN AND THE OTHER COLORS

WHITE AND THE OTHER COLORS

YELLOW AND THE OTHER COLORS

GRAY AND THE OTHER COLORS

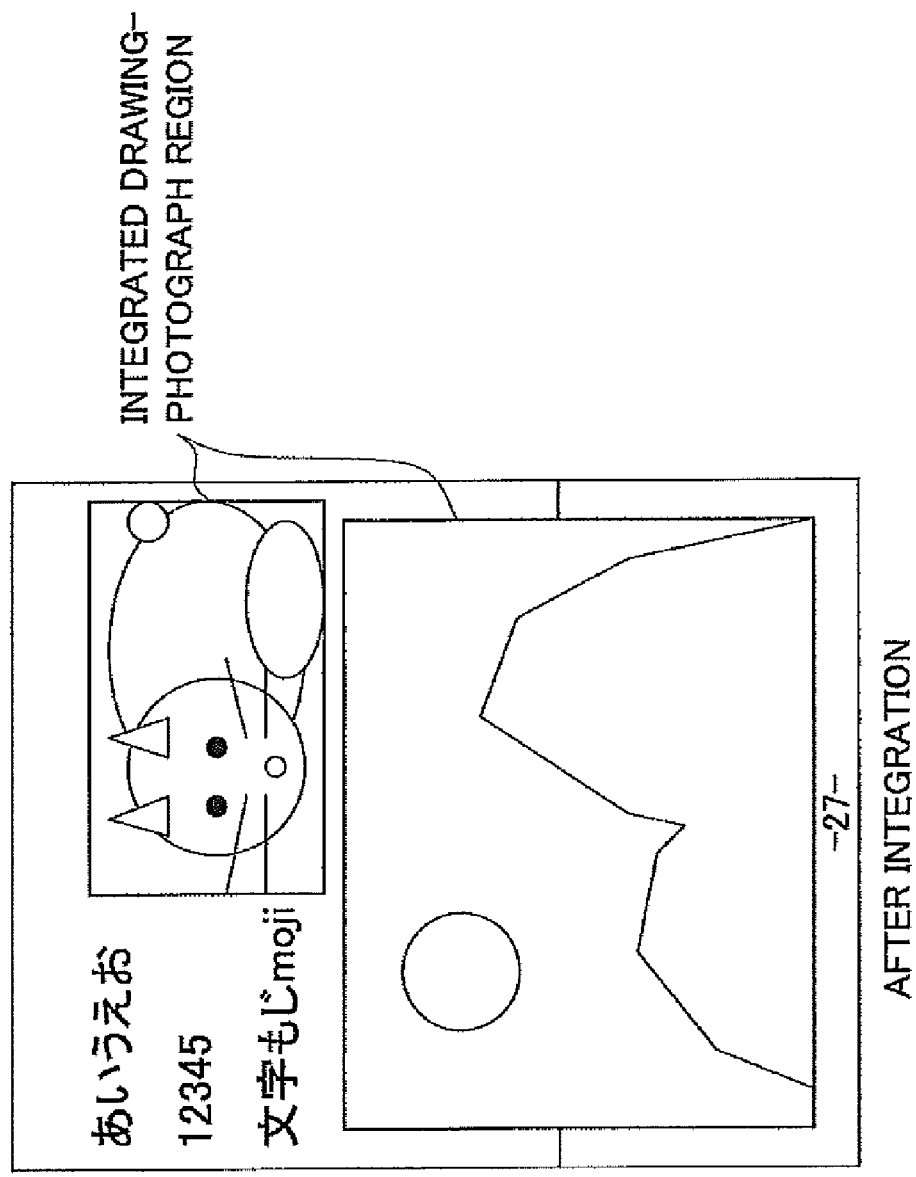

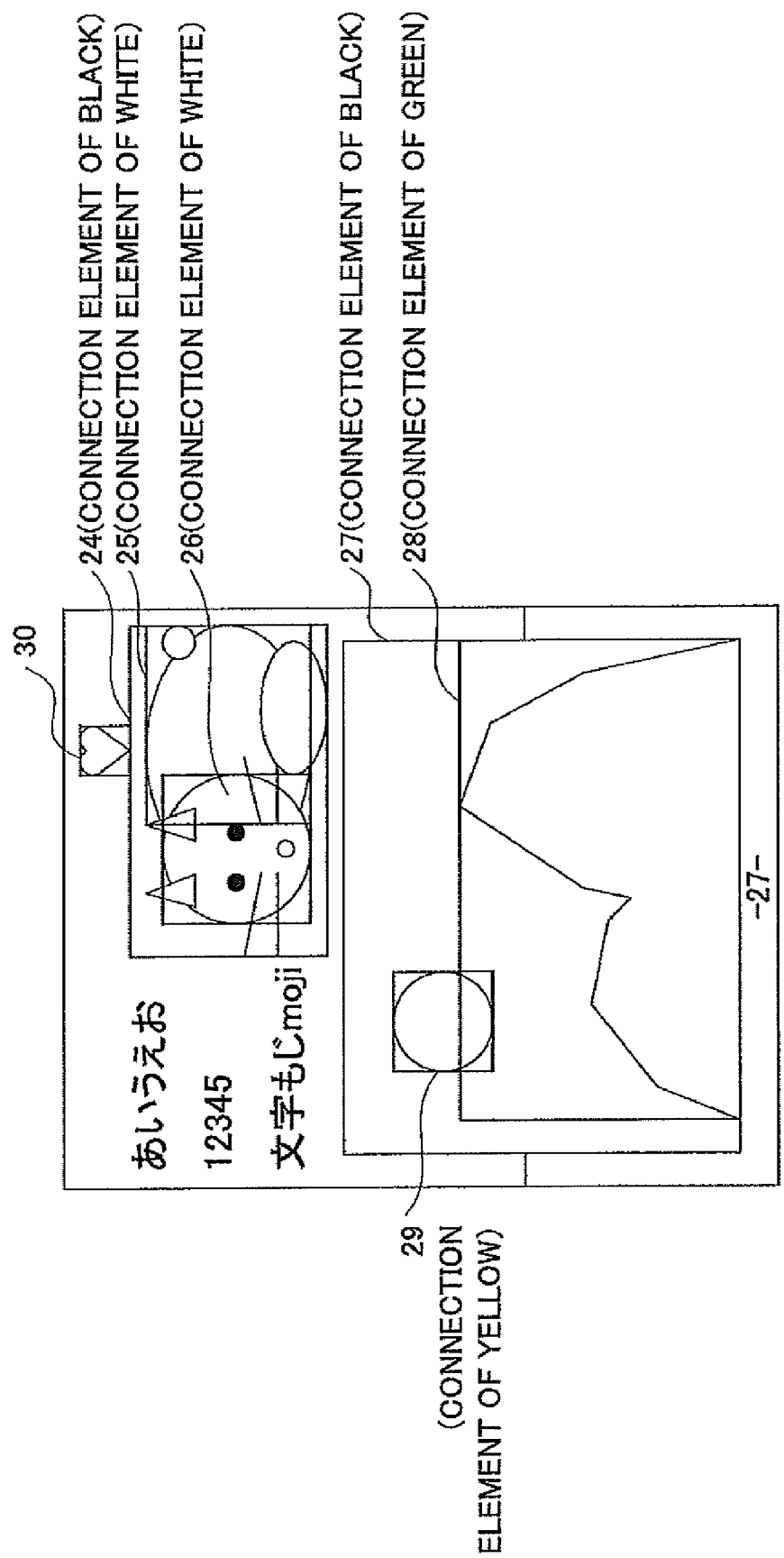

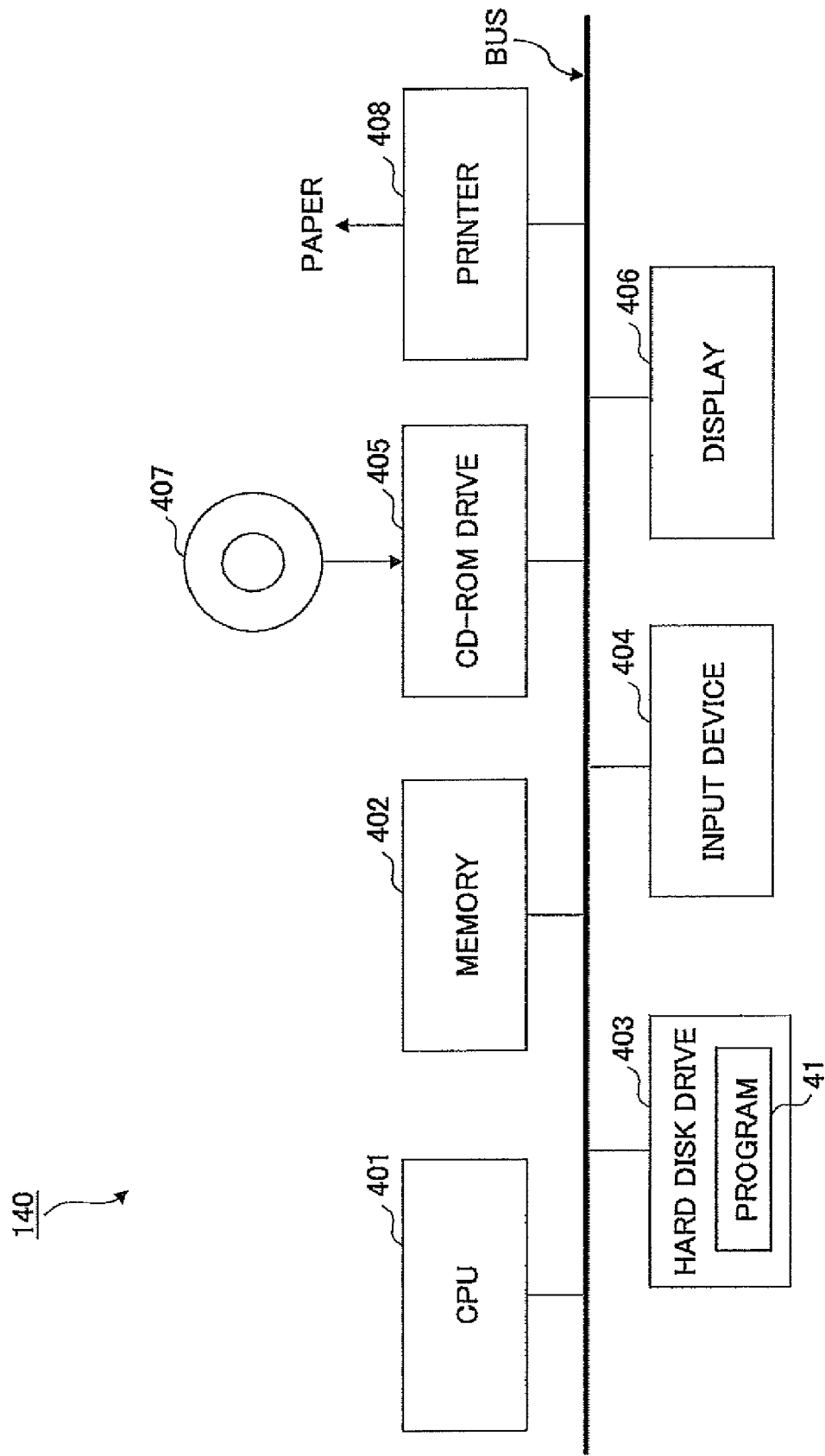

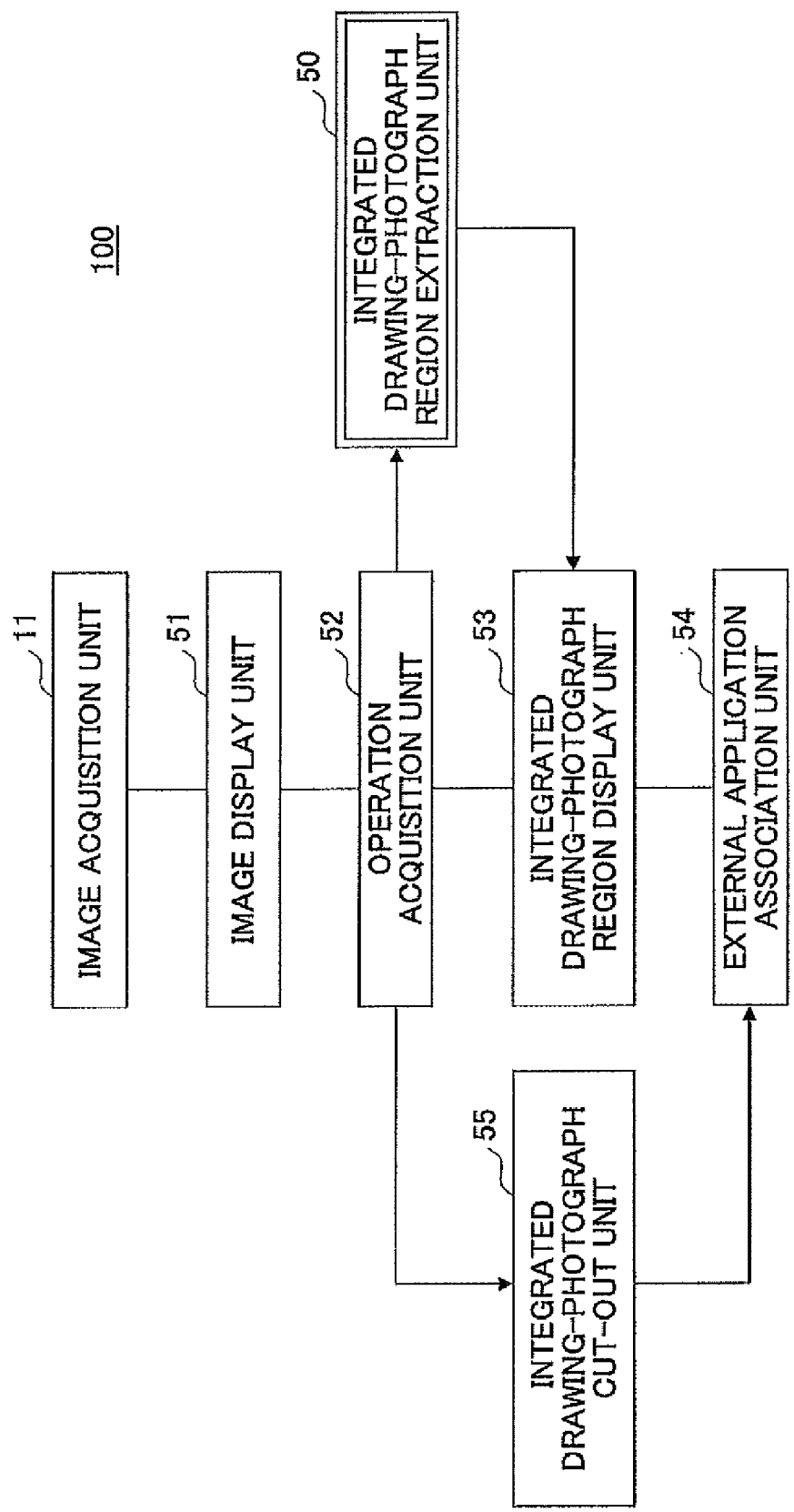

IMAGE PROCESSING APPARATUS, IMAGE PROCESSING METHOD AND IMAGE PROCESSING MEANS

BACKGROUND OF THE INVENTION

1. Field of the Invention

The present invention generally relates to an image processing apparatus or the like which extracts predetermined picture elements from image data, and more specifically, to an image processing apparatus, an image processing method and an image processing means, which extract reusable picture element information, such as a drawing or a photograph, in the image data by eliminating a text symbol region from the image data.

2. Description of the Related Art

When a document including drawings or photographs is newly prepared, it is preferable to reuse drawings or photographs already included in an older document. For achieving this, it is necessary for a user to carry out the following procedure. An older document including a drawing or a photograph is scanned with a scanner to create image data or image data stored on a memory device are loaded to a PC (personal computer), and the image data are processed with an image processing tool or the like installed on the PC, in which a predetermined region of the drawing or photograph of the scanned document is designated with a PC mouse by the user and the region is cut out (or copied) from the older document and pasted on a new document being prepared with the PC.

In the above procedure, it is more convenient for a user if candidate regions of drawings or photographs in a document are automatically cut out, since manual designation of the regions would then become unnecessary. For achieving this and also for improving accuracy of an OCR (Optical Character Recognition) process, techniques, which identify a position (or region) of a picture element of a drawing or a photograph in image data including a drawing or a photograph, have been proposed (e.g. patent documents 1-5).

Patent document 1 describes that an image recognition apparatus recognizes whether the image data are letters or photographs. In patent document 1, the image recognition apparatus collects edge data of image data and creates a projection histogram, in which the edge data are projected in a vertical direction of the image data based on the values of the edge data. A smoothing process is performed for the projection histogram to obtain a smoothed histogram, and subtraction is performed between the projection histogram and the smoothed histogram for each position (column) of the histogram. When a position indicates a subtraction value greater than a predetermined value, the recognition apparatus determines that a position (region) corresponds to a letter region.

Patent document 2 describes a photograph extraction method. In the photograph extraction method, the background color is obtained first, and a candidate region of a photograph is determined by obtaining a connecting value of a picture element in the region excluding the background region. For the picture elements in the region excluding the background region, circumscribed rectangular shapes are obtained from candidate regions where drawings or photographs having picture elements with the same color are categorized in a group. The photograph regions are determined from the number of the circumscribed rectangular shapes and the feature of overlapping of the circumscribed rectangular shapes.

Further, patent document 3 describes a letter extracting method that identifies the photograph regions from a background color and performs an OCR (Optical Character Recognition) process for the regions excluding the photograph regions. In patent document 3, a representative color is obtained from a block with a predetermined number of picture elements, and the background color is determined from the obtained largest cluster among the representative color clusters. Further, this method creates a run (rectangular shape) formed by connecting picture elements with a color that excludes the background color, and identifies the regions of letters, the regions of ruled lines and the regions of drawings/photographs based on the features and sizes of the rectangular shape.

Further, patent document 4 describes an extracting method that extracts letters from a document that includes background patterns such as a large number of small element patterns. Binary coded processing is performed for image data first, and circumscribed rectangular shapes are obtained from the connecting elements of the binary image generated from the image data. Further, the size of a letter is estimated based on a histogram obtained from sizes of the circumscribed rectangular shapes, and the regions of the letters and another region excluding the letters are separated based on density of the circumscribed rectangular shapes or the like.

Further, patent document 5 proposes a separation method that accurately (stably) separates between regions of letters and photographs. In this method, size reduction processing is performed for images, followed by discrete cosine transformation processing. The letter regions and the photograph regions are separated for each block based on the discrete cosine transformation variables and statistical features of variables indicating characterization of letters and photographs.

Patent document 1: Japanese Patent Application Publication No. 2006-128987

Patent document 2: Japanese Patent Application Publication No. 2004-110434

Patent document 3: Japanese Patent Application Publication No. 2001-297303

Patent document 4: Japanese Patent Application Publication No. 2002-015323

Patent document 5: Japanese Patent Application Publication No. H06-339019

In patent document 1, it is assumed that letter regions and drawing-photograph regions are extracted from a document in advance, or the image data of the letter and the image data of the drawing-photograph are initially separated as different files. Patent document 1 does not disclose a method used for extraction of letter regions and drawing-photograph regions from image data of a document in which letters and drawings/photographs are mixed.

Further, in patent documents 2 and 3, the background color is determined first, then extraction of letters and drawings/photographs is performed from image data of a document. If determination of the background color is inaccurate (unstable), extraction of photograph regions from image data cannot be properly performed. In the methods of patent documents 2 and 3, the background color, for example, the color of paper is assumed to be a single color, and as long as the background color corresponds to the color of the paper, the region excluding the background color region can be extracted. However, if the background includes more than one color, for example, when different background colors are used in different photograph regions, it becomes difficult to extract regions that must originally be differentiated as background colors from image data. Further, in patent document 4, if there is a graduation color (i.e. multiple colors) used in image data, extraction of photograph regions from the image data becomes inaccurate (unstable).

In patent document 4, extraction of letters can be performed. As for color image data, regions excluding letter regions may not be a single color. In this case, the regions excluding letter regions may not become black picture elements after a binary coded processing. As a result, there is no guarantee that the regions excluding letter regions become one block (one group). This makes it difficult to extract drawing-photograph regions as one block (one group) from the image data.

Further, in patent document 5, extraction of letters and drawings/photographs from image data is performed based on a balance between high frequency parts and low frequency parts which are obtained after the discrete cosine transformation processing. In this case, it is difficult to differentiate between line drawings and letters when the line drawings and letters are distributed in a similar manner.

SUMMARY OF THE INVENTION

This invention takes into consideration the issues above and relates to an image processing apparatus which extracts picture element information of picture elements forming drawings/photographs from image data. It is, therefore, one of objects of this invention to provide an image processing apparatus, an image processing method and an image processing means, all of which can accurately (stably) extract photographs and drawings from image data even if more than one color such as a graduation color exist on a background. Further, this invention may provide an image processing apparatus, an image processing method and an image processing means, all of which can extract letters from image data by differentiating between letters and line drawings without use of a method that differentiates photographs/drawings and letters based on information about each block of small picture elements or based on information of high frequency parts and low frequency parts obtained after the discrete cosine transformation processing.

According to another aspect of the invention includes an image processing apparatus which extracts, from image data, drawing-photograph pixels forming a drawing or a photograph, the image processing apparatus including, a pixel value replacement unit configured to replace original pixel values of image data with plural representative pixel values based on the original pixel values; a candidate region extraction unit configured to extract plural candidate regions, wherein each of the plural candidate regions is formed by a rectangular shape, and includes plural pixels being adjacent to each other and each of the plural pixels has the same representative pixel value; a feature value acquisition unit configured to acquire a feature value indicating certainty that symbol pixels forming symbols are contained in each of the plural candidate regions; a feature value determination unit configured to determine that each of the plural candidate regions in which the symbols are contained based on the feature value does not include the drawing-photograph pixels, and an integration unit configured to integrate other candidate regions that are determined to have the drawing-photograph pixels and that have an overlapping part.

According to another aspect of the invention an image processing apparatus for extracting, from image data, drawing-photograph pixels forming a drawing or a photograph, the image processing apparatus including, means for replacing original pixel values of image data with plural representative pixel values based on the original pixel values; means for extracting plural candidate regions, wherein each of the plural candidate regions is formed by a rectangular shape, and includes plural pixels being adjacent to each other and each of the plural pixels has the same representative pixel value; means for acquiring a feature value indicating certainty that symbol pixels forming symbols are contained in each of the plural candidate regions; means for determining that each of the plural candidate regions in which the symbols are contained based on the feature value does not include the drawing-photograph pixels, and means for integrating other candidate regions that are determined to have the drawing-photograph pixels and that have an overlapping part.

According to another aspect of the invention, an image processing method for extracting, from image data, drawing-photograph pixels forming a drawing or a photograph, the image processing method includes the steps of: (a) replacing original pixel values of image data with plural representative pixel values based on the original pixel values; (b) extracting plural candidate regions, wherein each of the plural candidate regions is formed by a rectangular shape, and includes plural pixels being adjacent to each other and each of the plural pixels has the same representative pixel value; (c) acquiring a feature value indicating certainty that symbol pixels forming symbols are contained in each of the plural candidate regions; (d) determining that each of the plural candidate regions in which the symbols are contained based on the feature value does not include the drawing-photograph pixels, and (e) integrating other candidate regions that are determined to have the drawing-photograph pixels and that have an overlapping part.

Other objects, features and advantages of the present invention will become more apparent from the following detailed description when read in conjunction with the accompanying drawings.

BRIEF DESCRIPTION OF THE DRAWINGS

FIG. 6A shows a region of pixels having the black cluster color and the other region of pixels having the other cluster colors;

FIG. 6B shows a region of pixels having the white cluster color and the other region of pixels having the other cluster colors;

FIG. 6C separately shows a region of pixels having the green cluster color and the other region of pixels having the other cluster colors;

FIG. 6D shows a region of pixels having the yellow cluster color and the other region of pixels having the other cluster colors;

FIG. 6E shows a region of pixels having the gray cluster color and the other region of pixels having the other cluster colors;

FIG. 9B shows image data in which the drawing-photograph element regions are integrated;

FIG. 23 shows an example of a hardware configuration of a PC;

FIG. 24 shows an example of a block diagram of the image processing apparatus 100 which is configured to reuse a drawing-photograph region;

DETAILED DESCRIPTION OF THE PREFERRED EMBODIMENTS

In the following, preferred embodiments will be described by referring to the figures.

First Embodiment

Figure 1:
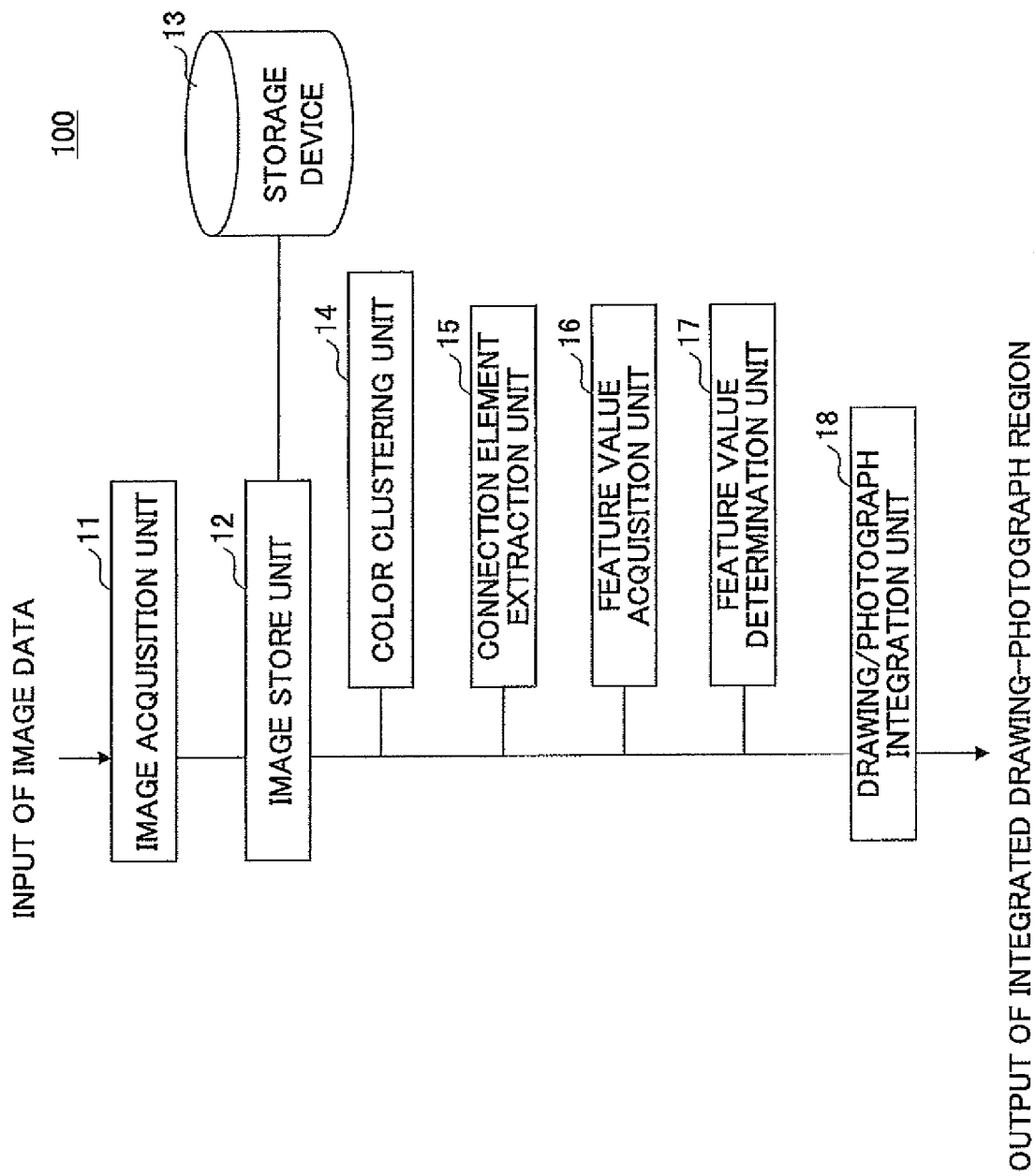
FIG. 1 shows a block diagram of an image processing apparatus 100 (first embodiment)

FIG. 1 shows a block diagram of an image processing apparatus 100 of this embodiment. The image processing apparatus 100 extracts picture element information of picture elements, such as photographs or drawings, as reusable units of image data acquired by an image acquisition unit 11. The drawings or photographs are defined as parts which exclude letters, but include tables. In the following, a drawing having a size of a reusable unit, and a photograph and a table having a size of a reusable unit will be referred as a drawing-photograph element.

The image processing apparatus 100 of this embodiment operates as follows.

Colors of image data are reduced into several colors (e.g., 4 through several tens of colors) by the color clustering process without determination of a background color.

After the color reduction of the image data by the color clustering process, connecting regions which include the same cluster colors are extracted.

After the color reduction of the image data with respect to predetermined colored regions and the other colored regions, each region is extracted by each cluster color of the color reduction.

Circumscribed rectangular shapes are established for each region, for example, and plural feature values of each region are acquired, so that drawing regions or photograph regions are determined.

By integrating the drawing regions and the photograph regions, the drawing regions and the photograph regions are extracted in one block region.

In this manner, regions of image data are extracted according to each cluster color. This allows stable extraction of drawings and photographs even if the background color contains more than one color. Further, since the drawing regions and photograph regions are determined based on plural feature values of a region, letters and line drawings can be extracted differently.

The image processing apparatus 100 may be, for example, a scanner apparatus, a copy machine, a fax machine, a MFP (Multi Function Printer), or a PC 40 (Personal Computer) connected to all of the above apparatuses.

The image acquisition unit 11 is, for example, an apparatus such as a scanner apparatus, a digital camera or the like, which converts a document into digital image data. The image acquisition unit 11 may be an NIC (Network Interface card) that receives converted image data via a network, if the image processing apparatus 100 is configured from the PC 40.

For example, a scanner apparatus includes optical-electrical conversion elements such as a one dimensional CCD (Charge Coupled Device) or CMOS (Complimentary Metal Oxide Semiconductor) which is arranged in a main scan direction. In the scanner apparatus, an exposure lamp radiating light having central wavelengths corresponding to three basic colors is arranged in an exposing position (in a sub-scan direction) to radiate the light to a document, in which each of the three color lights is sequentially emitted from the lamp. The optical-electrical conversion elements receive lights reflected from the document and perform optical-electrical conversion to generate analog data for each color of light. The analog data are converted into digital image data by an A/D (analog/digital) converter, and the digital image data are further corrected by shading correction, MTF (Modulation Transfer Function) correction and gamma correction. In this manner, digital data of three elements for each color of light are associated with one picture element (one pixel), so that color image data are obtained. The image data are stored on a storage device 13 by an image storage unit 12.

The image processing apparatus 100 includes a PC connected to a CPU executing a program, a RAM providing job space for executing the program and temporary storing data, a ROM storing setting files and parameters, a storage device 13 storing image data and the program and an input-output part performing data input/output via a bus.

Further, the image processing apparatus 100 includes the image storage unit 12 achieved by execution of a program by a CPU or a logic circuit such as an ASIC (Application Specific Integrated Circuit) or the like, a color clustering unit 14, a connection element extraction unit 15, a feature value acquisition unit 16, a feature value determination unit 17, and a drawing-photograph region integration unit 18.

The image storage unit 12 stores image data obtained by the image acquisition unit 11 on the storage device 13. The color clustering unit 14 quantizes picture element values (pixel values), and reduces colors of the image data to a color which is a dominant color of the quantized pixel values. The connection element extraction unit 15 connects pixels which have the same color after the color reduction. The feature value acquisition unit 16 acquires feature values from a connected region (pixels or picture elements) based on edge intensity, containing probability of containing letters, and the features and sizes of the circumscribed rectangular shapes. The feature value determination unit 17 determines whether a region is a drawing-photograph region by determining a feature value of the region based on a predetermined threshold value. The drawing-photograph integration unit 18 integrates drawing regions or photograph regions, and extracts the integrated region as one block (group). Further, the storage device 13 is a memory unit such as a hard drive or a semiconductor memory which stores image data, drawing-photograph elements and programs. In the following, extracting procedures of drawing-photograph elements performed by these units are described.

<Drawing-Photograph Element Extraction Procedure>

Figure 2:
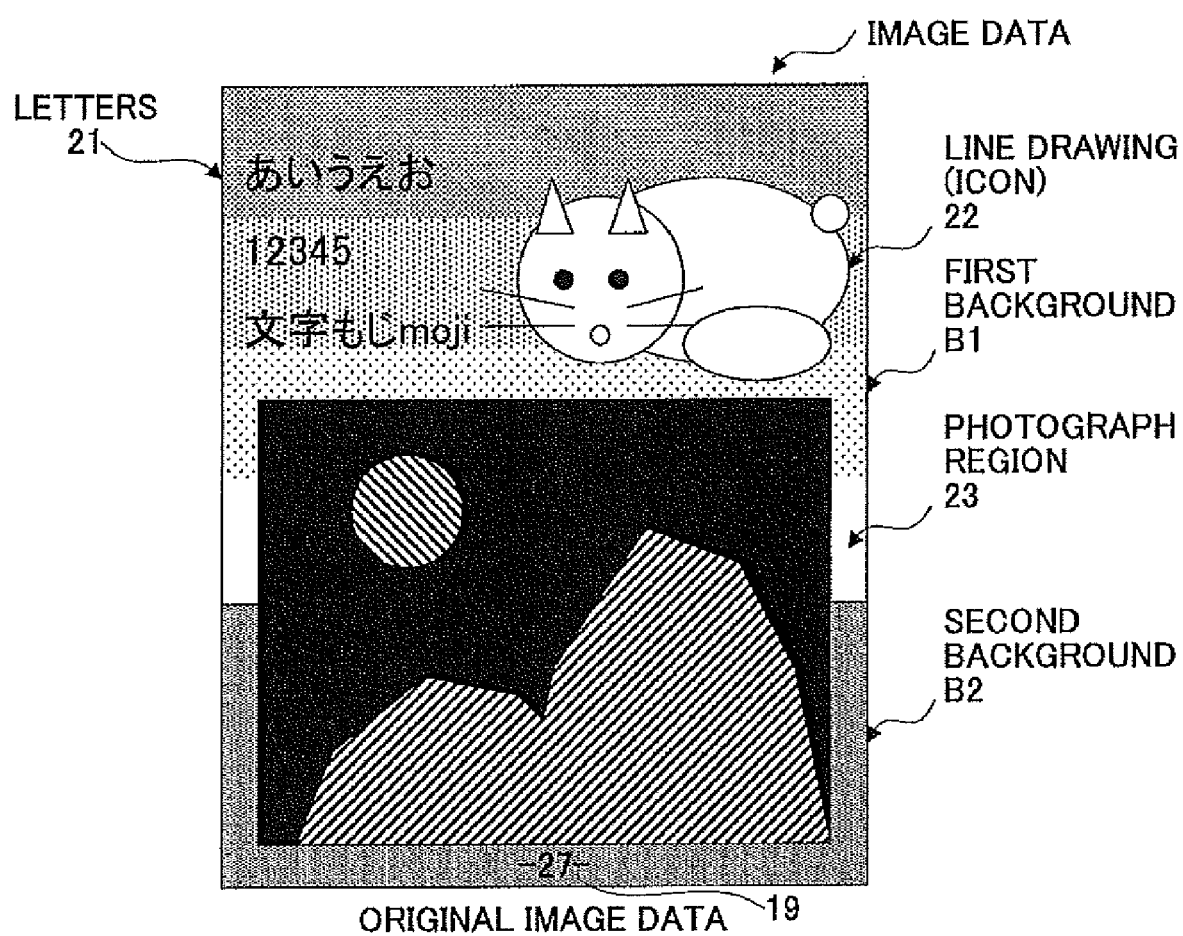
FIG. 2 shows an example of image data (original image) in which drawing-photograph elements are to be extracted.
Figure 3:
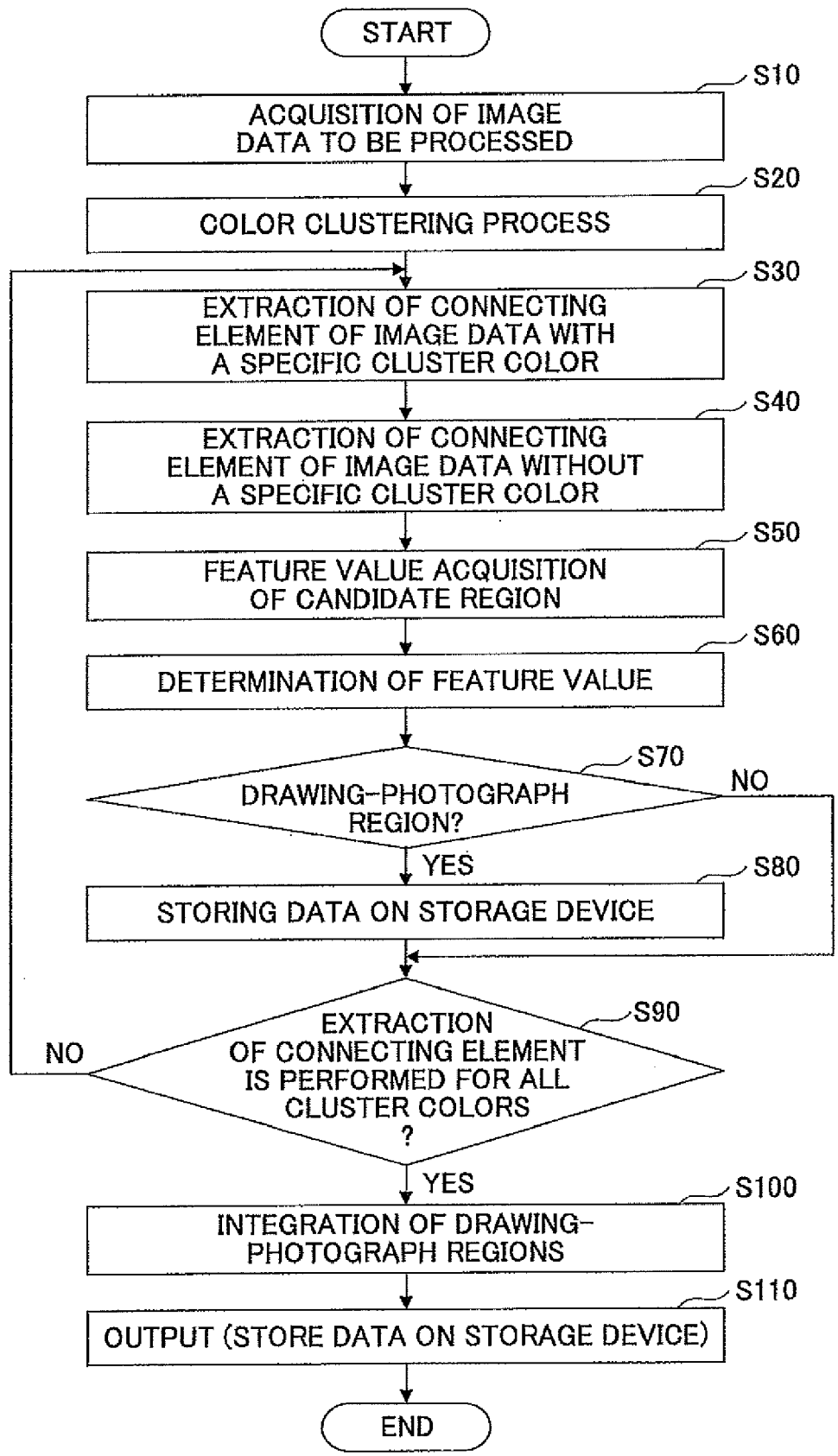
FIG. 3 is a flowchart showing the procedure of drawing-photograph element extraction performed by the image processing apparatus 100.

FIG. 2 shows an example of image data (original image) in which drawing-photograph elements are to be extracted. FIG. 3 is a flowchart showing the procedure of drawing-photograph element extraction performed by the image processing apparatus 100.

Image data of FIG. 2 is, for example, color image data having a predetermined size (such as a VGA: video graphics adapter, SVGA: super video graphics adapter, XGA: extended Graphics Array, SXGA: super extended Graphics Array, UXGA: ultra extended Graphics Array), in which each element of RGB includes plural bits. The image data of FIG. 2 include a first background B1 and a second background B2, and further include a photograph region 23 which overlaps the second background B2 and the first background B1. Further, a line drawing of a cat (icon) 22 and letters 21 are drawn on the first background B1, and a page number 19 is drawn on the second background B2. In this case, the letters 21, the line drawing 22 and the page number 19 are, for example, one black color, and the second background B2 is, for example, one color which is close to a gray, and the photograph region 23 includes, for example, 16,770,000 colors. Further, the first background B1 is, at least, a color different from the color of the second background B2 or a gradation color. As the image processing apparatus 100 of this embodiment performs color reduction, as described below, the letters 21, the line drawing 22, the page number 19 and the second background B2 do not need to be a single color.

<S10> As shown in the flowchart of FIG. 3, step 10 indicates that the process starts when the image processing apparatus 100 is operated so that drawing-photograph elements are extracted. With this, the image acquisition unit 11 may read a document set on the image acquisition unit 11 by use of an optical method to generate image data, or may read image data stored on the storage device 13.

<S20> In step S20, the color clustering unit 14 performs a color clustering process (color reduction process) for image data to be processed. In this step, pixels of the image data are grouped by groups of about several colors.

Figure 4:
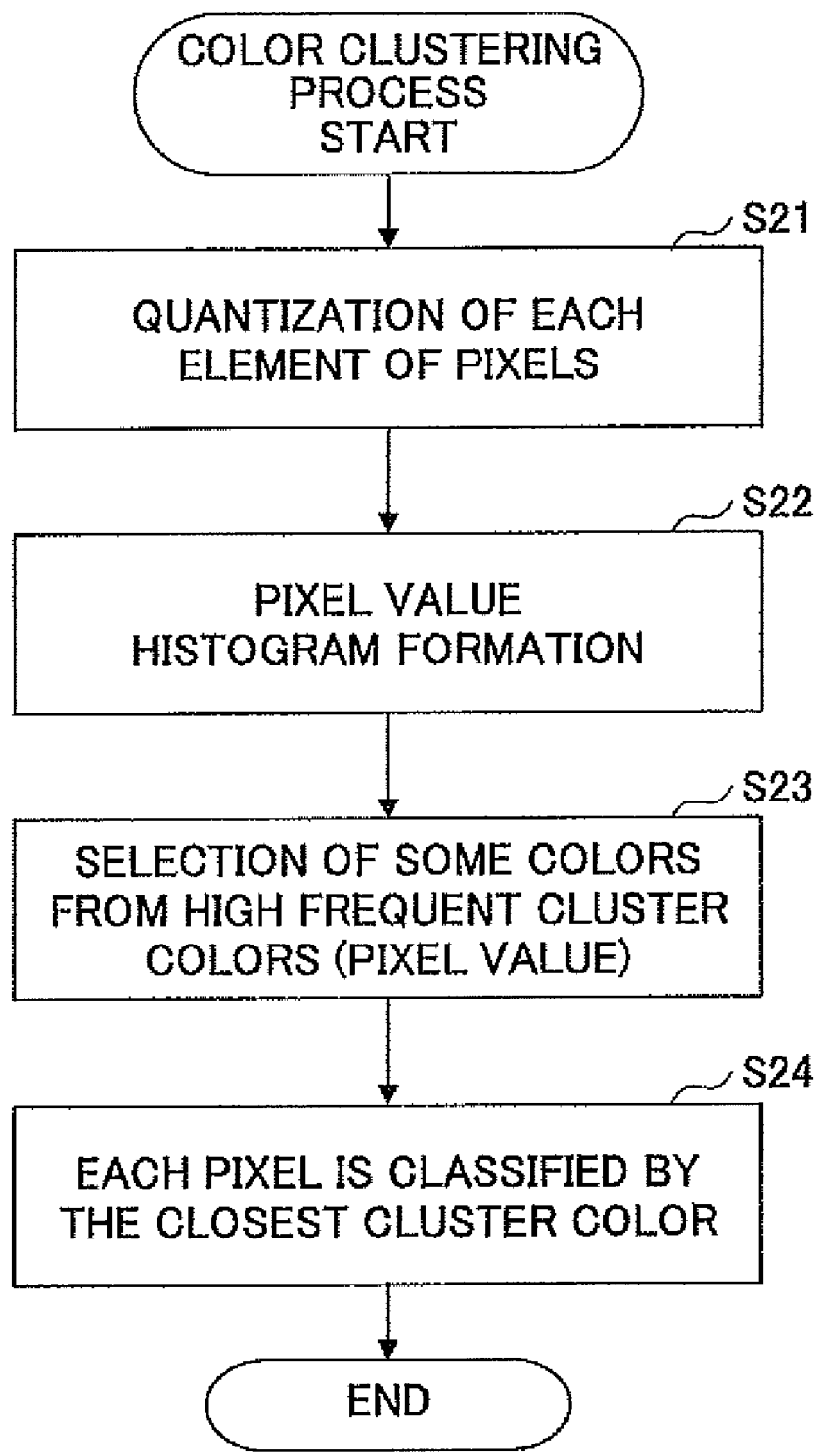
FIG. 4 is a flowchart showing a procedure of the color clustering process.

FIG. 4 is a flowchart showing a procedure of the color clustering process. As for individual elements (RGB: red, green, and blue) pixel values (picture element values) are quantized first (S21). For example, if each of the elements (RGB: three color elements) of pixel values (variety of colors) is quantized by four colors (four color gradations), the total number of colors are obtained by 4×4×4=64 colors. If a pixel has a value of 256, the quantization is performed to convert numbers from 0-63 to 32, from 64-127 to 96, from 128-191 to 160, and from 192-255 to 224. Further, if the image data is gray image (not color image), each of the elements of pixel value only has brightness, so that each element can be quantized into four (colors).

Next, a histogram of pixel values is created (S22). As each pixel has a pixel value indicating one color (color number) between 0 and 64 after the quantization, pixels having the same color number are counted and plotted in the histogram.

Further, pixel values (color) showing high frequency are selected based on the histogram, and as a result, the variety of colors are narrowed down (S23). Further, several colors are selected from the narrowed colors. The several selected colors are referred as cluster colors in the following.

Next, for all pixels having quantized pixel values (colors), each color of the pixels is analyzed and classified to a cluster color which has the closest color distance to the color of the pixel (S24). A color distance may be obtained by summation of squared differential values between each color element (R,G,B) of a cluster color and each color element (R,G,B) of the color of the pixel, or by absolute summation of the differential values between each color element (R,G,B) of a cluster color and each color element (R,G,B) of the color of the pixel. Thus, for all pixels, the pixel value (color number) of each pixel is associated with one of the cluster colors.

Figure 5:
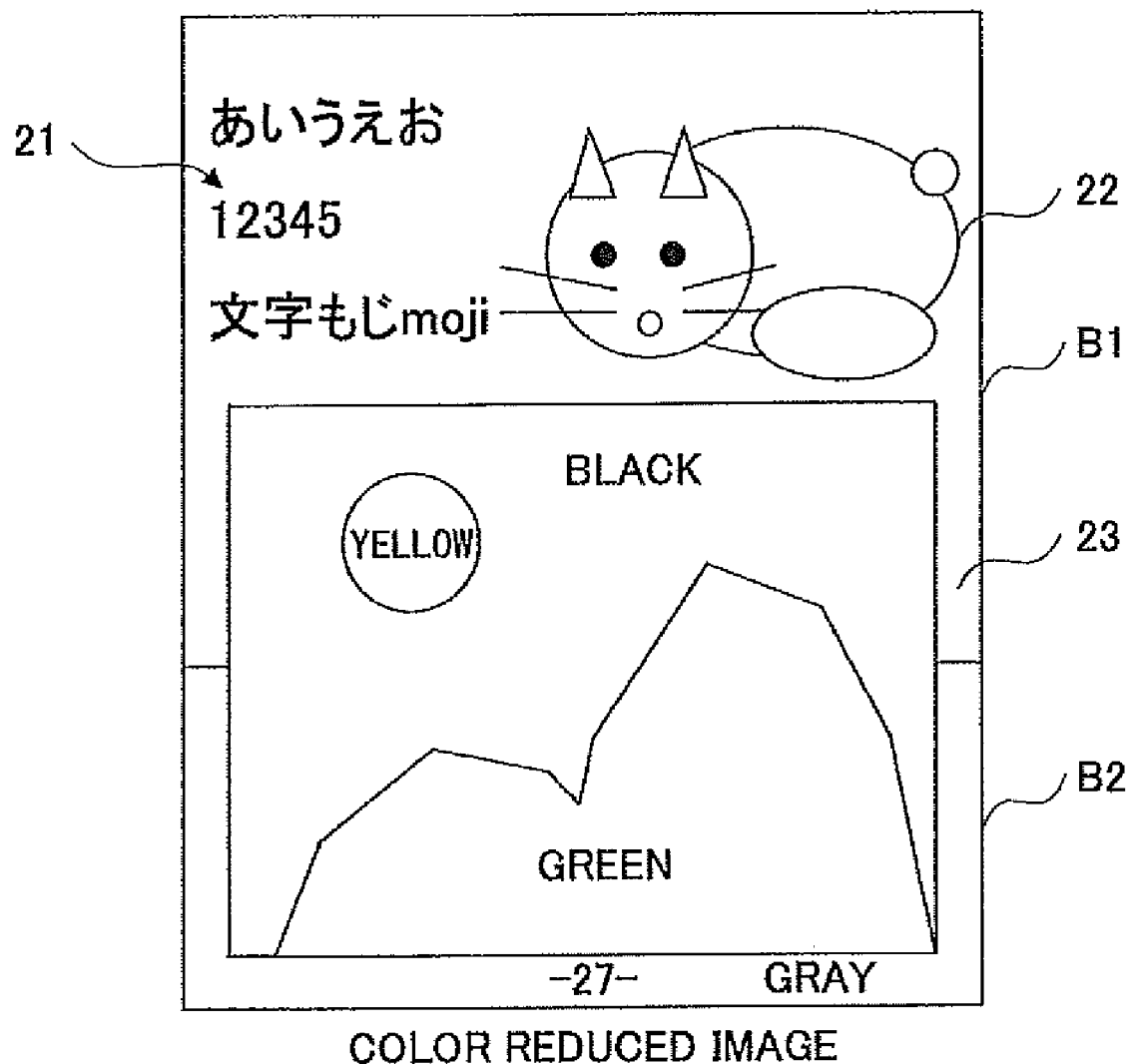
FIG. 5 shows an example of a color reduction image after the color clustering process.

FIG. 5 shows an example of a color reduction image after the color clustering process. FIG. 5 is actually a color image, which is reduced to five cluster colors, that is, white (white cluster color), black (black cluster color), yellow (yellow cluster color), green (green cluster color), and gray (gray cluster color). In the following, the letters 21 and the line drawing 22 are assumed to be black for simple explanation. Further, the color of the second background B2 is reduced to a gray color which is close to that of the second background B2. The first background B1 having been a gradation color is reduced to a white cluster color, for example. As for the photograph region 23, the color of the moon is reduced to yellow cluster color, the color of a mountain is reduced to green cluster color, and the other regions are reduced to black cluster color.

<S30, S40> Steps S30 and S40 will be described below with reference to FIG. 3. The connection element extraction unit 15 selects one cluster color (from the five cluster colors), and extracts pixels corresponding to the cluster color and being connected to other pixels which correspond to the same cluster color. These two procedures are performed for every cluster color. As for the cluster colors described above, the extractions of connecting pixels are performed between the white cluster color and the others, between the black cluster color and the others, between the yellow cluster color and the others, between the green cluster color and the others, and between the gray cluster color and the others.

Figure 6A:
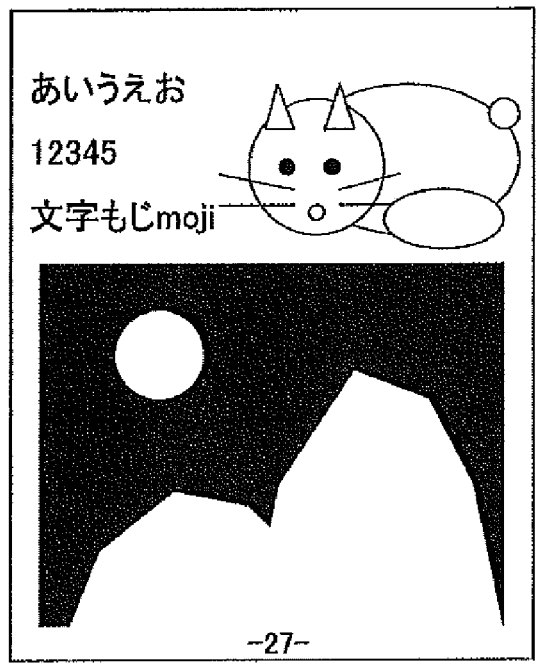
FIGS. 6A through 6E are drawings showing examples in which a region of pixels having a cluster color and the other region of pixels are separately indicated.
Figure 6B:
Figure 6C:
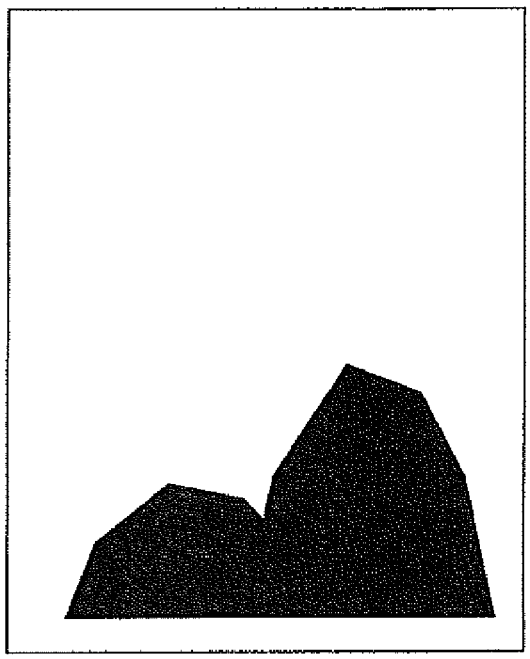
Figure 6D:
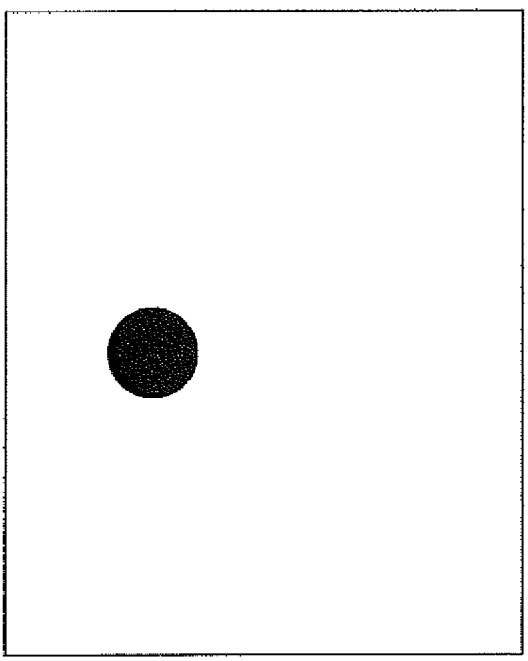
Figure 6E:
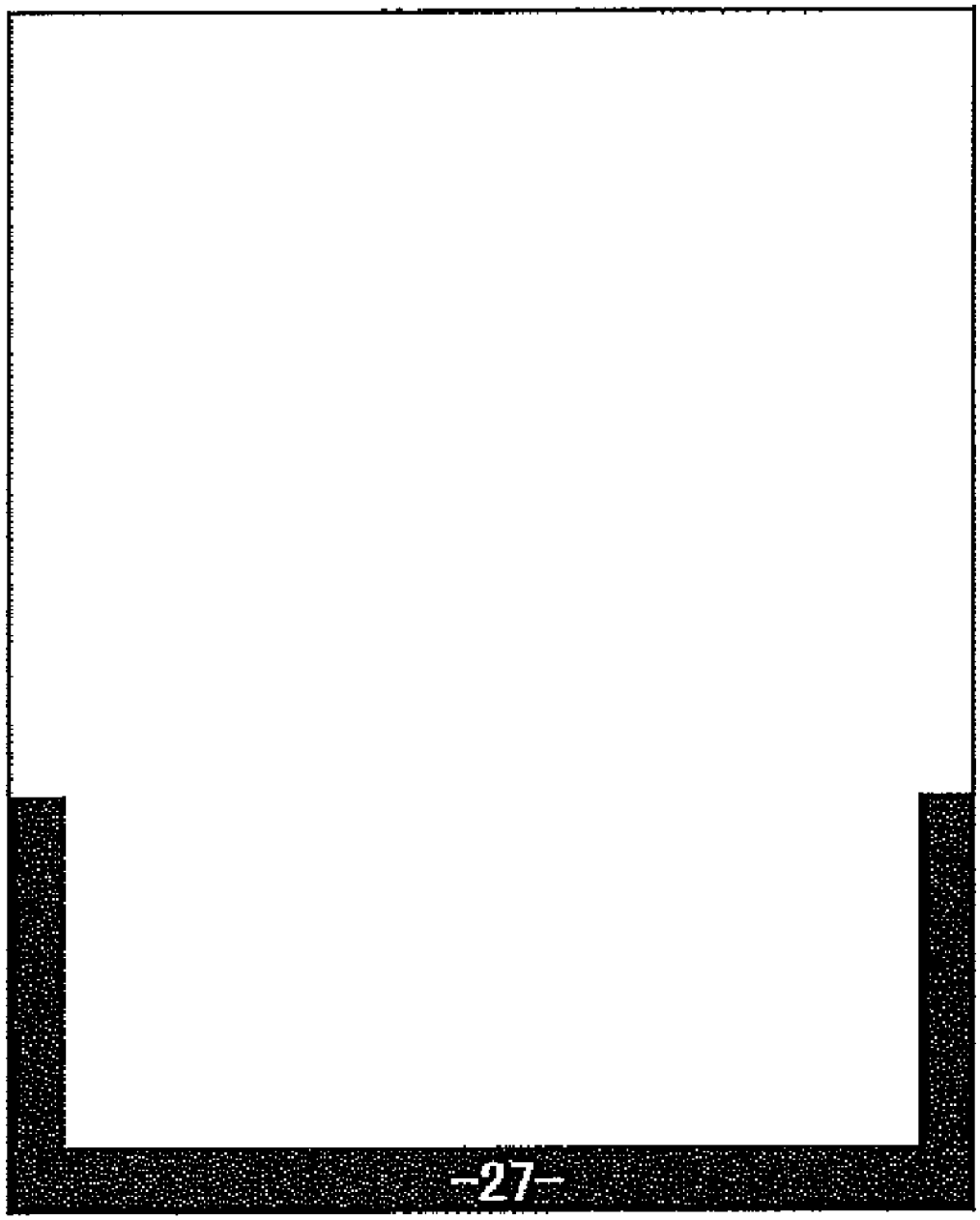

FIGS. 6A through 6E are drawings showing examples in which a region of pixels having a cluster color and the other region of pixels are separately indicated. FIG. 6A shows a region of pixels having the black cluster color and the other region of pixels having the other cluster colors, FIG. 6B shows a region of pixels having the white cluster color and the other region of pixels having the other cluster colors, FIG. 6C separately shows a region of pixels having the green cluster color and the other region of pixels having the other cluster colors, FIG. 6D shows a region of pixels having the yellow cluster color and the other region of pixels having the other cluster colors, and FIG. 6E shows a region of pixels having the gray cluster color and the other region of pixels having the other cluster colors. Further, since the drawings are shown in black/white colors in FIG. 6A-6E, binarized images are shown, in which the cluster colors are indicated by a black color, and colors excluding the cluster colors are indicated by a white color.

Figure 7:
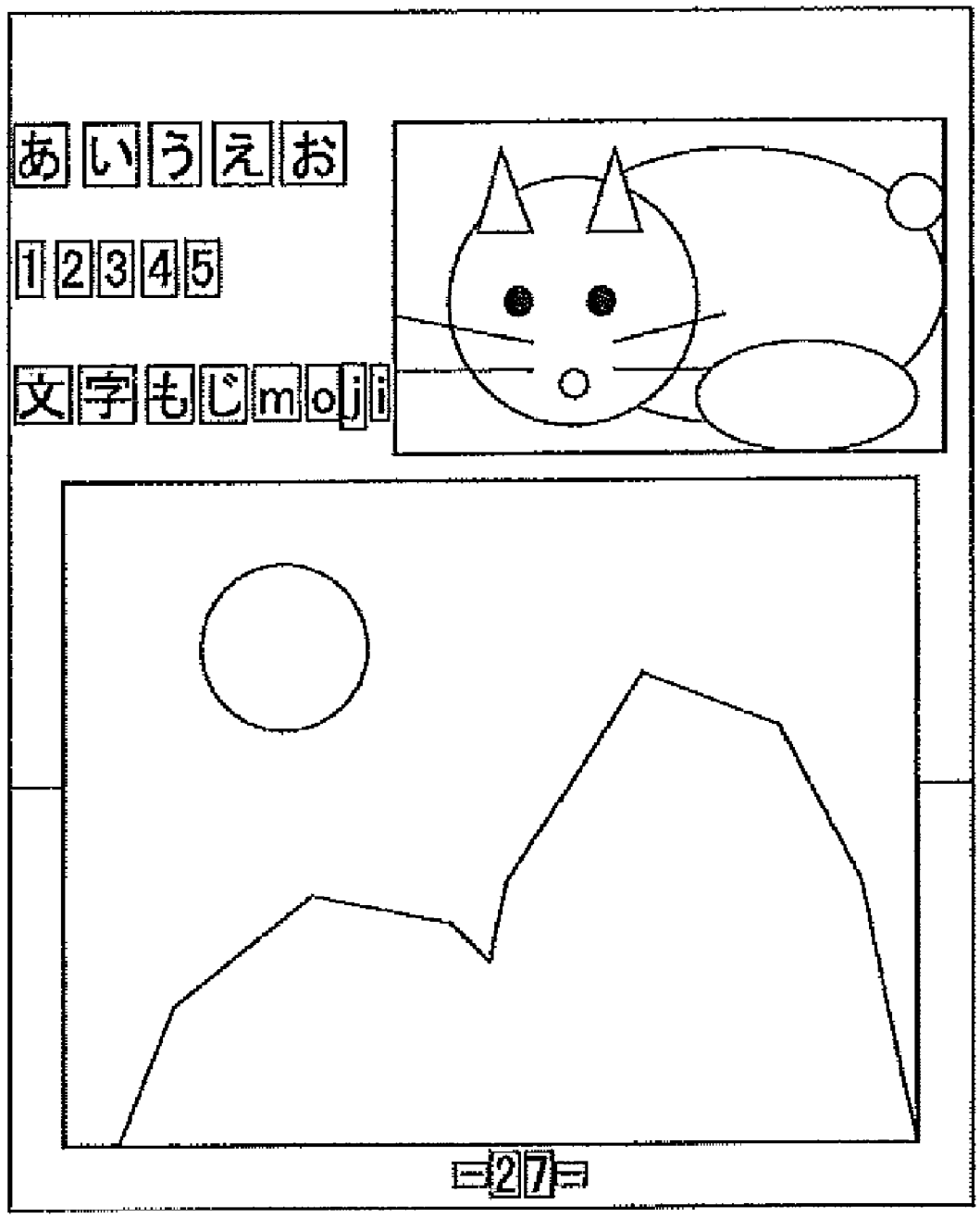
FIG. 7 shows a black color region and the other region with circumscribed rectangular shapes of connecting elements of black color pixels.

For example, as for the image separately indicated by a black color region and the other region in FIG. 6A, circumscribed rectangular shapes of connecting elements of black color pixels are shown in FIG. 7. Circumscribed rectangular shapes obtained for different cluster colors by this manner become drawing-photograph candidate regions. The connection element extraction unit 15 determines respective circumscribed rectangular shapes of connected pixels as drawing-photograph candidate regions. In this case, the circumscribed rectangular shapes including drawings of symbols such as letters, numbers, and alphanumeric characters are excluded from the drawing-photograph candidate regions. Thus, the first background B1 including the letters 21 and the second background B2 including the page number 12 are not extracted as the drawing-photograph elements.

<S50> The feature value acquisition unit 16 extracts feature values indicated in each candidate region. The feature values are used for indications when each candidate region is determined whether the candidate region corresponds to a drawing-photograph region or the other regions. The feature value may include several indications (parameters). For example, the indications in the following are used.

<A1. Edge Intensity (Edge Intensity Information)>

Edge intensity (variation of pixel values between adjacent pixels) can be calculated from a filter value which is obtained by performing a space filtering process such as a Sobel filtering process for each pixel in the candidate region. When the obtained edge intensity indicates a large number, it is highly possible that the pixels of the candidate region are the letters 21 or the line drawing 22.

For example, if all the filter values in the whole candidate region are added up, and the added value is divided by the total number of the pixels included in the whole candidate region to obtain an average value, it becomes possible to compare between the average value and a predetermined threshold value without influence of the size of the candidate region. Further, edge intensity may be defined by the number of pixels which indicate edge intensities that are greater than the predetermined value. The process described above may be referred as a letter extraction process.

<A2. Degree of Letter-Pixel Contained in Pixel>

Figure 8:
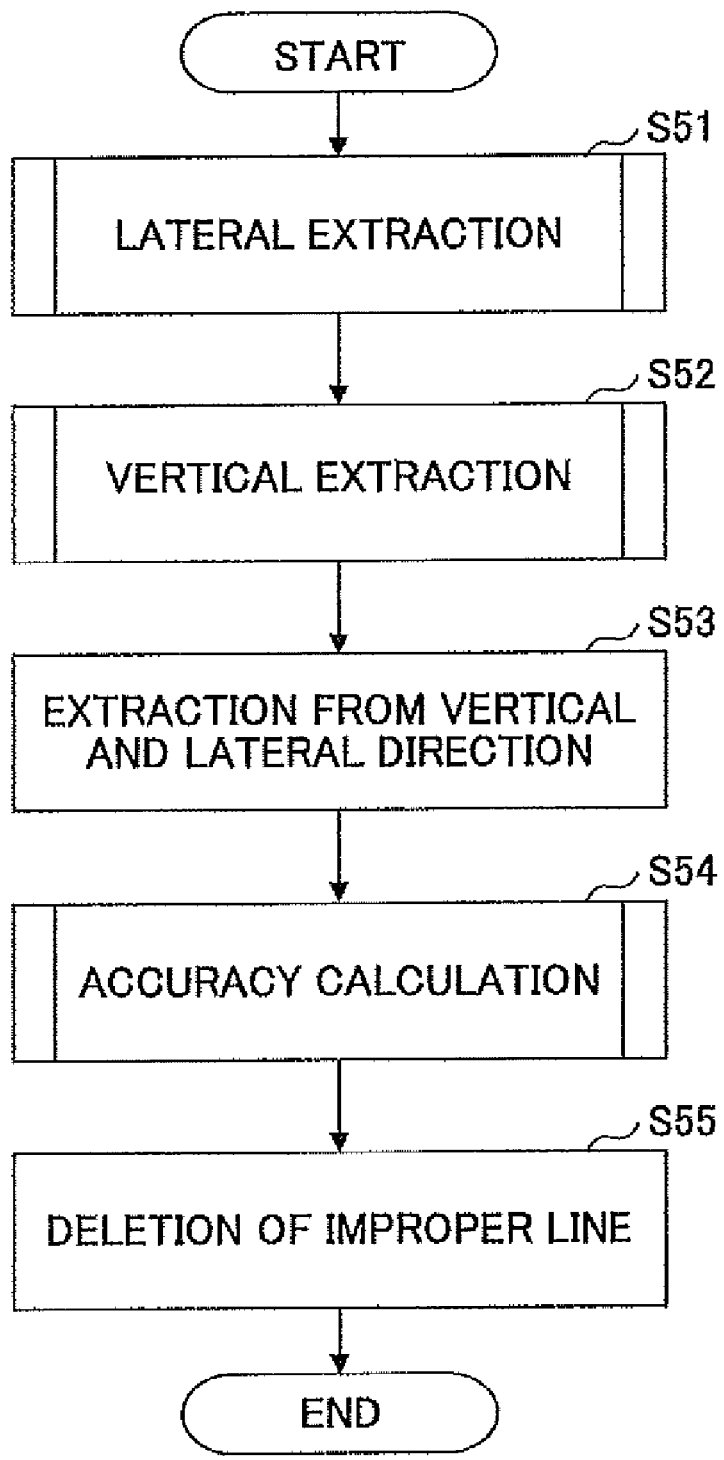
FIG. 8 is a flowchart showing a procedure of extracting the letters 21.

A letter extraction process is performed for every candidate region, and information of the number of pixels of the letters 21 included in the candidate region is used. FIG. 8 is a flowchart showing a procedure of extracting the letters 21.

First, the letter extraction process is performed in a lateral line direction (S51). There are several methods for extracting letters in the lateral line direction. In this case, elements of connected pixels having black (black pixels) are used. Since an initial circumscribed rectangular shape of connected pixels has been obtained, the letter extraction process is performed to extract a neighboring circumscribed rectangular shape, in which the neighboring circumscribed rectangular shape is positioned near the region of the initial circumscribed rectangular shape in the line direction (lateral direction). In this case, the near region may be defined as being approximate in size to the circumscribed rectangular shape. The near region may be referred to as separation (distance) or predetermined separation (distance) between candidate regions.

Further, if there is a neighboring circumscribed rectangular shape to be connected to the initial circumscribed rectangular shape, the neighboring circumscribed rectangular shape is examined to determine if the size of the neighboring circumscribed rectangular shape is similar to the initial circumscribed rectangular shape. For example, as for circumscribed rectangular shapes to be connected to each other, if their heights are similar and their positions are close, then it can be determined that the circumscribed rectangular shapes form the same line. By performing (examining) this connecting process for all of the circumscribed rectangular shapes, it is possible to detect candidate regions of letters in the lateral direction (lateral line extraction).

Further, the letter extraction process is performed in a vertical direction as well as in the lateral direction (S52).

Letter candidate regions are extracted in the lateral direction and vertical direction. In the letter candidate regions in the lateral direction and the vertical direction, it is determined if overlapping letter candidate regions exist. If there is an overlapping letter candidate region, a lateral line and a vertical line crossing at the overlapping letter candidate region are extracted respectively (S53).

Next, it is assumed that one of the extracted lines (a vertical line and a lateral line) corresponds to the correct line of a letter region. For such a determination, calculations are performed to determine accuracy (letter candidate region accuracy) of letter candidate regions for other crossing lines of letter candidate regions (S54).

There are varieties of methods considered as calculation methods of the letter candidate region accuracy. In this case, the following method is used.

First, a length and a height are obtained for a letter candidate line (letter candidate region) to be calculated. Based on the obtained length and height, an aspect ratio (length to height ratio) of the letter candidate line is calculated. Further, distances (letter spacing or character spacing) between the connection elements of the line are calculated. Further, for taking into account sizes of the connection elements of the line, the number of the connection elements having similar sizes to letters is counted with respect to the connection elements.

The aspect ratio, the letter spacing, and the number of the connection elements above are used as feature values (parameter values) to calculate an accuracy degree (a letter line accuracy) for representing the letter candidate region accuracy. A letter line accuracy may be referred to as letter line accuracy information, character line accuracy information or symbol line accuracy information. There are varieties of methods to obtain a letter line accuracy that can be considered. In this case, the letter line accuracy is determined by calculating a linear combination of absolute values obtained from subtractions between preliminarily obtained typical feature values and the parameter values.

Next, based on the letter line accuracy obtained from a pair of the letter candidate lines overlapping each other, one of the lines, which is determined not to be a letter candidate line, is eliminated (S55). When the letter line accuracy shows a small number, it indicates that the calculated letter candidate line is most likely a letter line. Thus, when compared between a vertical letter candidate line and a lateral letter candidate line, one of the lines having the smaller letter line accuracy is regarded as the correct letter candidate line, and then the other one is eliminated (deleted).

According to the process described above, correct letter lines can be extracted. Further, a related example of this technique is incorporated by reference in Japanese Patent Application Publication No. 2004-038530.

<A3. Size of Circumscribed Rectangular>

The size of circumscribed rectangular shapes is used to determine the letters 21 region. The size of the letters 21 is based on an aspect ratio, the length and the height. The range of the aspect ratio, the length, and the height, is limited to a certain range. A number of candidate regions, which can be included in a range having the predetermined aspect ratio and length, is used as a feature value to determine whether a region is a drawing-photograph element region or not.

<S60, S70>

Next, in step S60, based on the feature value obtained in the step S50, a candidate region is determined either to be or not to be a drawing-photograph element. The feature value determination unit 17, for example, examines feature values of A1-A3 based on a predetermined threshold value, and a candidate region having a feature value satisfying all conditions is determined to be a drawing-photograph region (element). Further, feature values may be calculated with a weighted linear combination, and then the obtained feature value is compared with a predetermined threshold value. For example, a linear combination is defined as $a1 \cdot A1 + a2 \cdot A2 + a3 \cdot A3$, and the result is compared with a predetermined threshold value. In this case, a1 through a3 indicate weighted values. As for the edge information of A1, a1 may be set as a small value, since a line drawing 22 can be detected with the edge information. As for the circumscribed rectangular (shape) A3, a3 may be set as a small value, since a circumscribed rectangular shape of the line drawing 22 can be detected. For example, the relationship of weighted values (numbers) may be $a1 < a3 < a2$.

By the determination in step S70, the letter 21 is detected from the first background B1 and the page number 19 is detected from the second background B2 as shown in FIG. 6A. The first background B1 and the second background B2 are determined not to be drawing-photograph element regions.

<S80> If a region is determined to be a drawing-photograph element region, the feature value determination unit 17 registers (stores) the drawing-photograph element candidate region (named as a drawing-photograph region) on a storage device 13. Before the drawing-photograph element region is performed by the color reduction process, the pixel value information is stored on the storage device 13 in association with the identifying number of the drawing-photograph element region and the position of the pixel. Further, the pixel value information to be registered may be the pixel value information of the circumscribed rectangular shape of the drawing-photograph element or may be only the pixel value information of the drawing-photograph element. When the pixel value information of the drawing-photograph element is only registered (stored), the pixel value information of pixels corresponding to the peripheral part (rectangular) of the circumscribed rectangular shape can be handled by extracting only the pixel value information corresponding to the drawing-photograph element.

<S90> Processes of step 30 through step 80 are performed for all cluster colors.

<S100> After the drawing-photograph element region is registered for all cluster colors, the drawing-photograph integration unit 18 integrates the drawing-photograph element region.

<S110> The drawing-photograph integration unit 18 stores the integrated drawing-photograph region on the storage device 13 in association with the file name of the original image data.

Image data shown in FIG. 5 include a line drawing 22 and a photograph region 23. In most cases, the line drawing 22 and the photograph region 23 can be formed by plural drawing-photograph regions. For this reason, when extracting drawings and photographs in a block (group), it is preferable that drawing-photograph element regions forming the line drawing 22 or the photograph region 23 are integrated in a block (group) instead of extracting them individually.

Figure 9A:
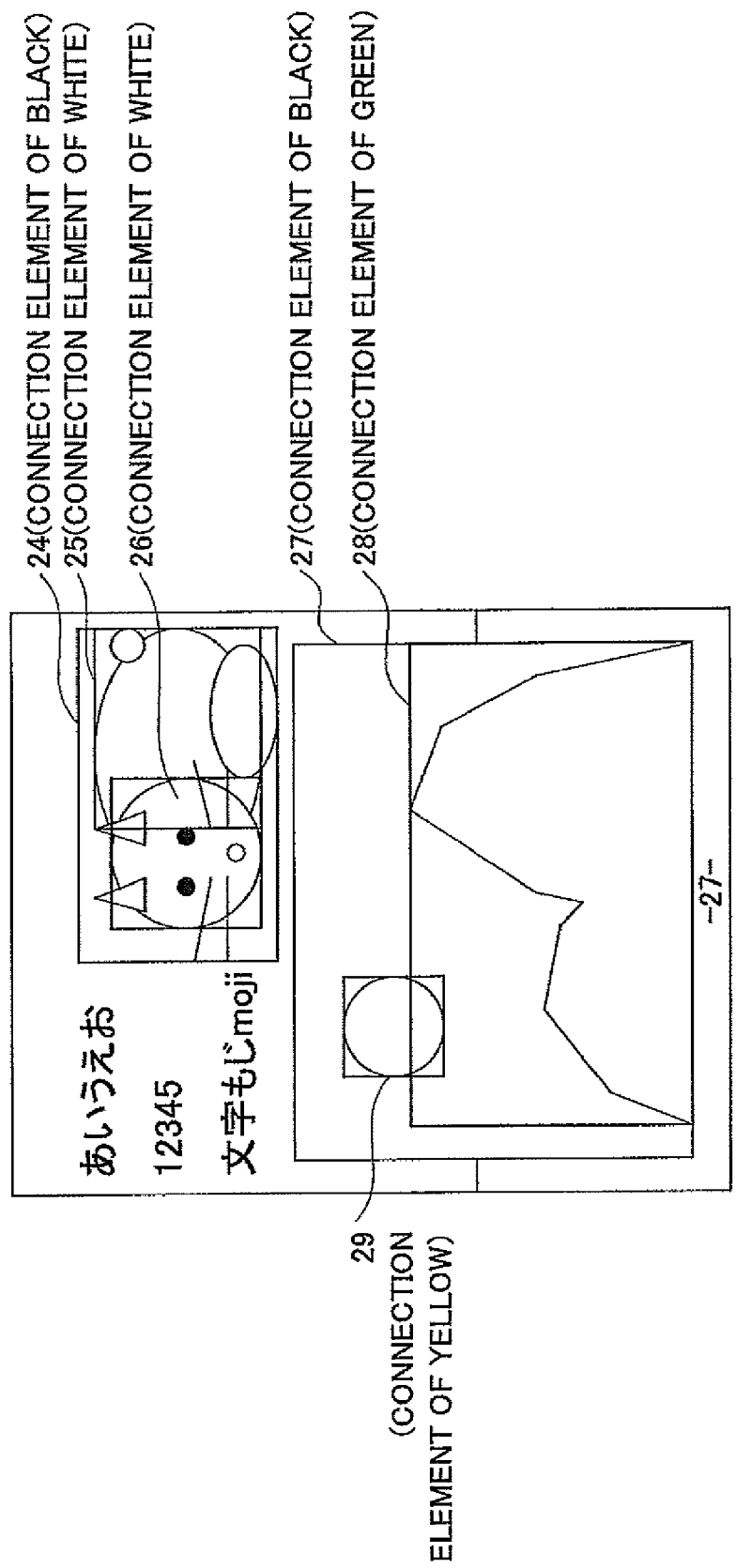
FIG. 9A shows image data having plural drawing-photograph element regions which are encompassed by circumscribed rectangular shapes.

FIG. 9A shows image data having plural drawing-photograph element regions which are encompassed by circumscribed rectangular shapes. Based on FIG. 6B indicating extraction of white color pixels and other pixels excluding the white color, it is found that the line drawing includes some white connecting elements (e.g. the face of a cat, a body, paw, a tail, ears etc.). These parts, respectively, become drawing-photograph element regions (In FIG. 9B, some parts of the drawing-photograph regions are omitted). In this manner, drawing-photograph regions are extracted for other cluster colors.

In FIG. 9A, the line drawing 22 includes three drawing-photograph element regions 24-26, and the photograph region 23 includes three drawing-photograph element regions 27-29. It is preferable that the drawing-photograph element regions 24-26 and the drawing-photograph element regions 27-29 are integrated in one block (group), since those regions are characterized as one group.

There are varieties of integration methods to be considered. As an example, the drawing-photograph element regions 24-26 and 27-29 having overlapping parts with each other may be extracted in sequential manner. Those extracted drawing-photograph element regions may be associated with each other. As shown in FIG. 9A, since each of the drawing-photograph element regions 24-26 has partially overlapping parts or fully overlapping parts, the drawing-photograph element regions 24-26 are integrated as one block; and since each of the drawing-photograph element regions 27-29 has partially overlapping parts or fully overlapping parts, the drawing-photograph element regions 27-29 are integrated as one block. FIG. 9B shows image data in which the drawing-photograph element regions are integrated. In the following, a region integrated from drawing-photograph element regions is referred to as an integrated drawing-photograph region.

Further, if drawing regions and photograph regions, respectively, are determined based on the feature value obtained in step s50 (in FIG. 3), those regions may be respectively integrated based on their own attributes (features).

<S110> The image processing apparatus 100 outputs each of integrated drawing-photograph element regions separately. Each of the integrated drawing-photograph element regions may be printed out or stored with a predetermined format such as a JPEG format on the storage device 13. Thus, users can use (reuse) the integrated drawing-photograph element regions for preparing documents.

As described above, the image processing apparatus 100 can extract drawings and photographs as one block from image data of an original document. Since the drawings and photographs are extracted by each cluster color with processing the color reduction according to the cluster colors, drawing-photograph elements can be evenly distributed if the background includes more than one color.

The advantage of the procedure explained above may be easily distinguished when referring to patent document 2. The method of the patent document 2 identifies background colors of a document. For example, assuming that the method of patent document 2 is applied to the case of FIG. 6B in which a white color is used as the background color, in this case, the method of the patent document 2 can only extract a region without the white region. Namely, the method of patent document 2 cannot identify between the second background B2 and the photograph region 23, and as a result, the method of the patent document 2 cannot extract the only photograph region 23. On the other hand, as shown in FIG. 9B, the image processing apparatus 100 of this embodiment can properly extract the only photograph region 23 even if the background includes more than one color.

Further, as indicated by step S50 of FIG. 3, since plural feature values are used to determine drawing-photograph elements from many different aspects, the line drawing (a line drawing of a cat) 22 and the letters 21 can be properly extracted separately as shown in FIGS. 9A-9B.

Second Embodiment

In this embodiment, it is described that an image processing apparatus 100 processes a binary image. A binary image can be obtained by omitting part of the first embodiment. It may be regarded that a photograph region 23 is excluded (or if included, the region 23 is not identified), but letters 21 and a line drawing 22 are only present in images.

Figure 10:
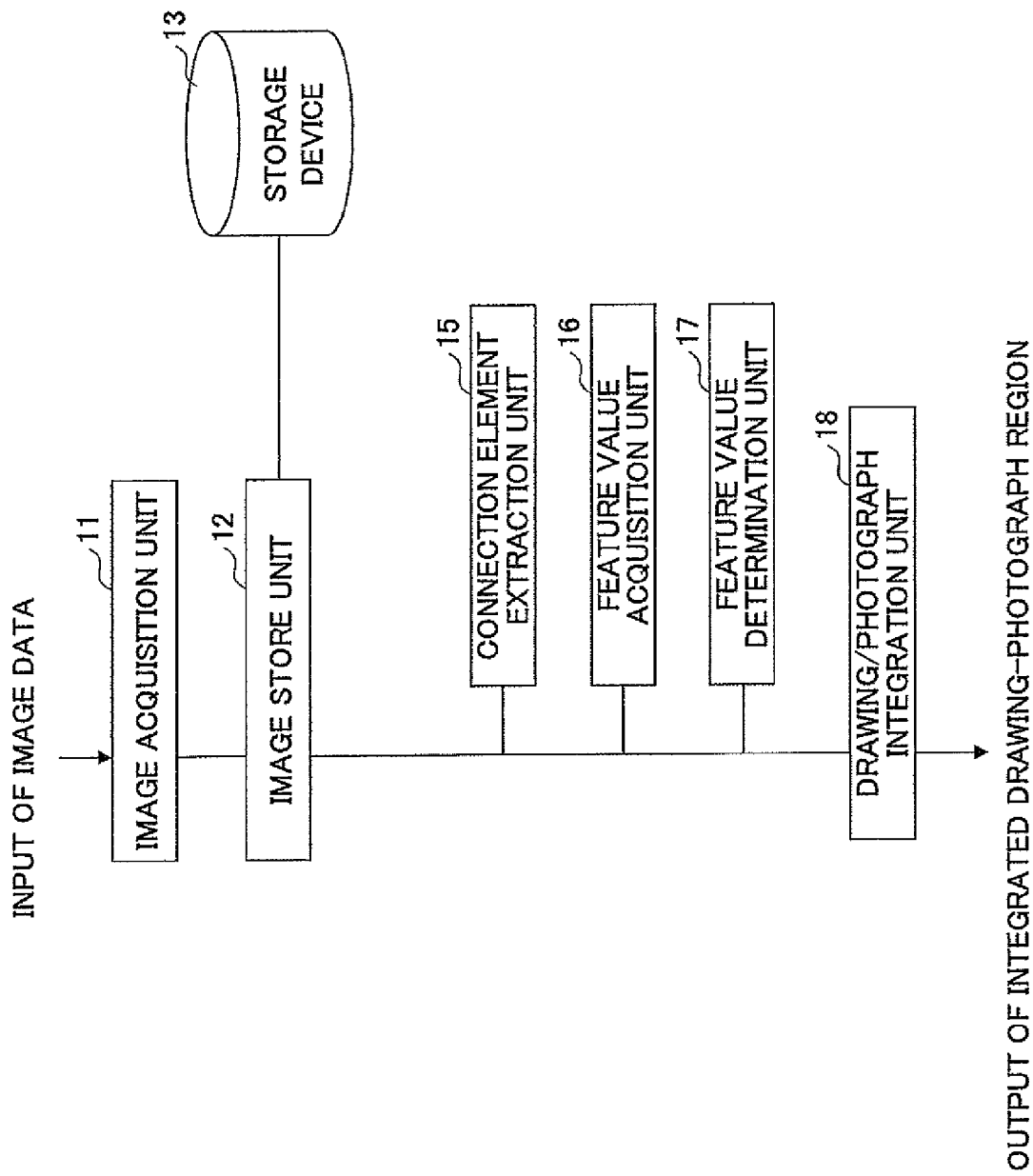
FIG. 10 shows a block diagram of the image processing apparatus 100 (second embodiment)

FIG. 10 shows a block diagram of the image processing apparatus 100 of the present embodiment. Further, as for individual units indicated in FIG. 10, some units identical to those used in FIG. 1 are indicated by the same symbols used in FIG. 1, and the explanation about the symbols are omitted. The image processing apparatus 100 of FIG. 10 does not include a color clustering unit 14, which is different from the case of FIG. 1. This is because this embodiment is applied to a binary image, that is, no more color reduction can be performed.

Figure 11:
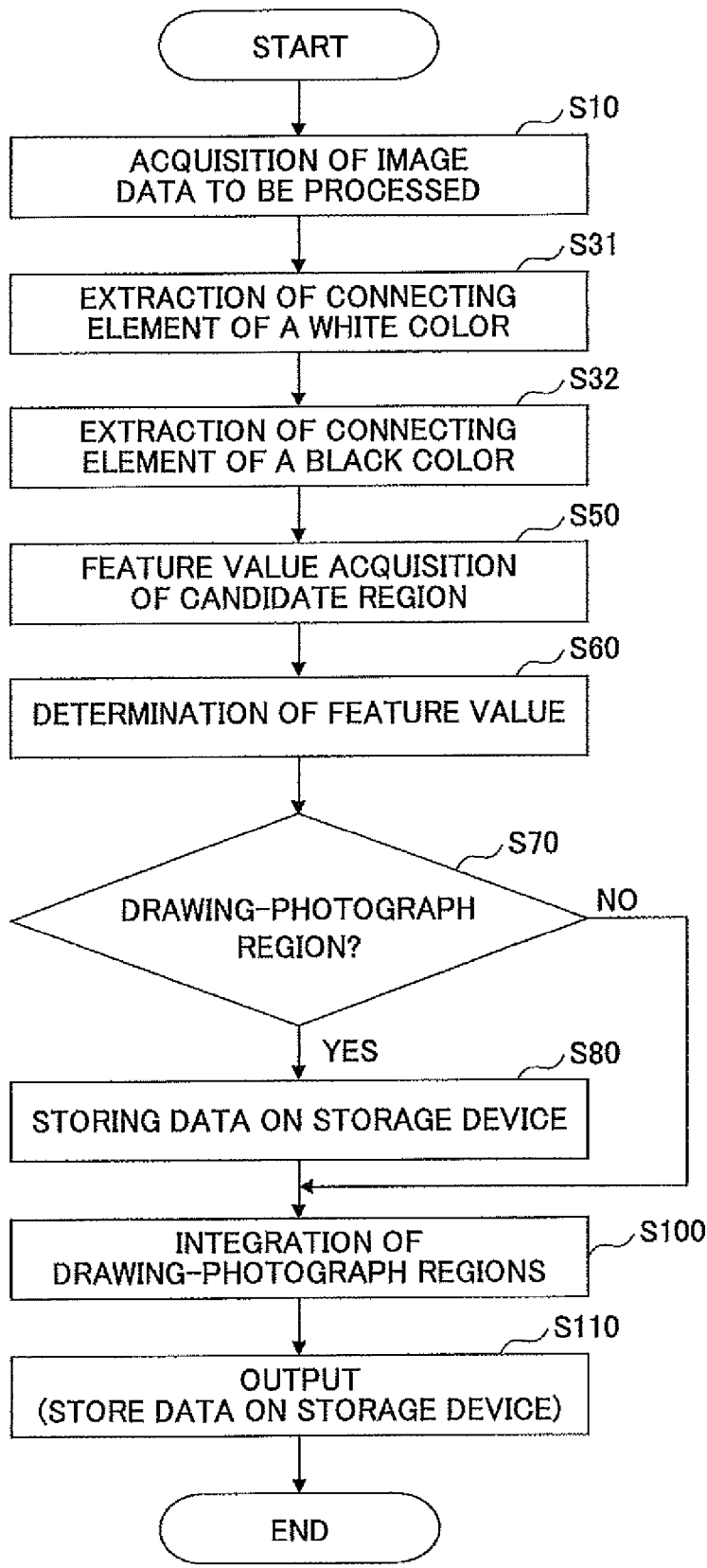
FIG. 11 is a flowchart showing a procedure in which the image processing apparatus extracts drawing-photograph elements from an image (data or document)

FIG. 11 is a flowchart showing a procedure in which the image processing apparatus extracts drawing-photograph elements from an image (data or document). Further, as for individual steps indicated in FIG. 11, some steps identical to those used in FIG. 3 are indicated by the same symbols used in FIG. 3, and the explanation about the symbols are omitted.

In FIG. 11, steps S31 and S32 are executed instead of steps S30 and S40 of FIG. 3. Also, the determination of step S90 in FIG. 3 is omitted. This is because only binary data (two colors) are used, that is, execution of step S90 is unnecessary for other colors.

<S31, S32> Connection process of pixels is performed for white pixels and non-white pixels (in this case, black pixels are used). With this process, the letters 21 and the line drawing 22 are extracted as connected pixels data if those are included in image data.

<S50> In this step, the circumscribed rectangular shape of the black pixels is determined as a candidate region of a drawing-photograph element region. As for a feature value in the candidate region, acquisition steps of feature values (in the case of the first embodiment, A1: edge intensity) are unnecessary for multiple colors.

<S60> The feature values of a multi-bit image are not used for the determination of feature values. The feature values of the degree of letter-pixel contained in pixel (A2) and the size of circumscribed rectangular shape (A3) used in the first embodiment may be used. In this case, when determining feature values by using the linear combination technique, it is noted that the threshold value used for comparison should be a smaller value compared to the case of the first embodiment.

The other processes are similar to that of the first embodiment. By integration of drawing-photograph element regions, the line drawing 22 is extracted as one block.

According to the image processing apparatus of this embodiment, the image acquisition unit 11 determines whether an acquired image data is formed by a binary image, and if the image data is a binary image, a proper process for binary image data is performed. This can reduce a processing load (calculation load) when extracting drawings and photographs from image data, similar to the case of a multi-bit image.

Third Embodiment

When image data to be processed are a color image or a gray image, it is advantageous if the process of the first embodiment is applied to a size-reduced image, because this can save processing time and memory space to be installed. In this embodiment, an image processing apparatus 100, which eliminates letters 21 and extracts drawings and photographs by forming a reduced image, is described.

Further, the number of pixels of the letters 21 of the letter line is counted, and a ratio between the obtained number and the number of pixels of each candidate region is calculated as a drawing-photograph feature value. This feature value is used to determine whether a region is a drawing-photograph region. A ratio having a large number indicates a region having only letters 21.

If backgrounds or photograph regions are formed from small dots with plural colors (pixel features), it is expected that the number of connected elements can be drastically reduced by forming a reduced image, because the small dots can be combined with the other surrounding colors. With this, the use of memories and processing time can be saved (reduced), since this process prevents an increase in connected elements. Also, the size of the image is reduced, and as a result, the number of connected elements also decreases.

Further, since this process is used to extract drawing-photograph regions from image data, it is preferred that the letters 21 are excluded from the image data to be performed by the clustering process. Then, in advance of the formation of the reduced image (data), the positions of pixels of the letters 21 are identified and eliminated from the original image data. This can prevent a region of color clustering from containing the color of letters when the color clustering process is performed, so that the accuracy of the color clustering process is improved.

Figure 12:
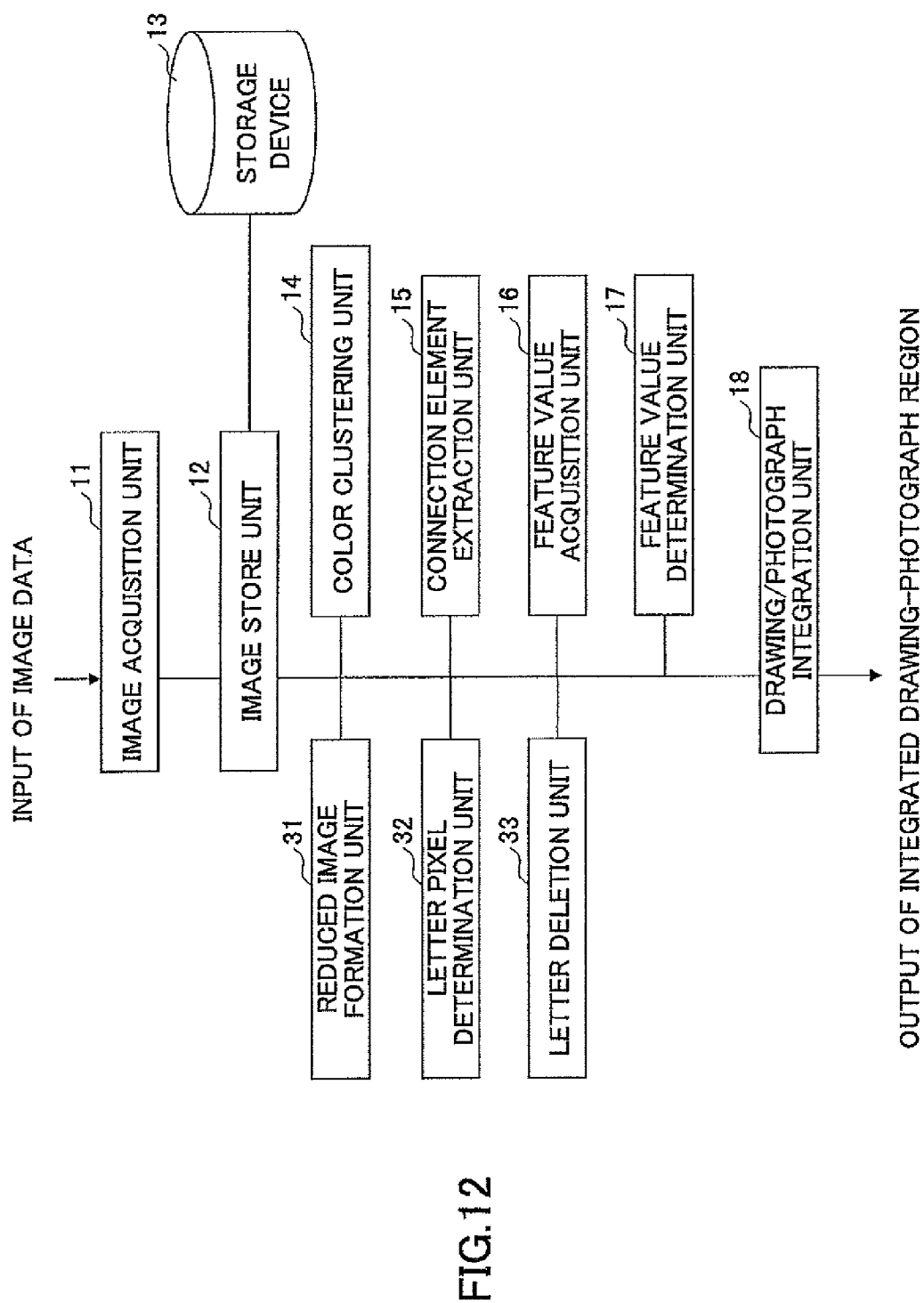
FIG. 12 shows a block diagram of the image processing apparatus 100 (third embodiment)

FIG. 12 shows a block diagram of the image processing apparatus 100 of this embodiment. In FIG. 12, as for some parts identical to the parts which are used in FIG. 1, the same symbols are used and the explanation about the symbols is omitted. The image processing apparatus 100 of FIG. 12 includes a reduced image formation unit 31 which forms reduced images, a letter pixel determination unit 32 which determines the letters 21, and a letter (symbol) elimination unit 33 which eliminates the letters 21 (symbols).

Figure 13:
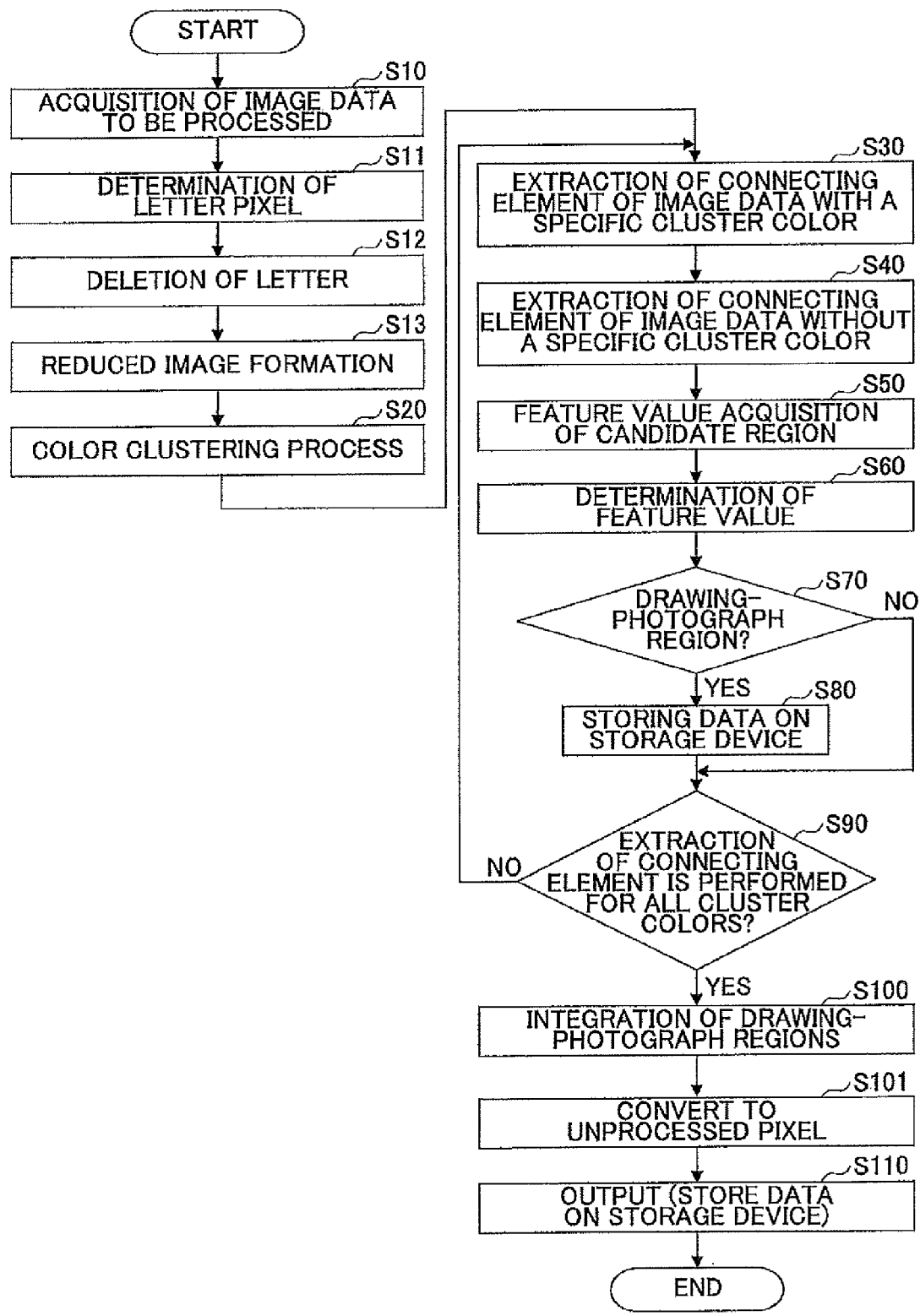
FIG. 13 is a flowchart showing a procedure in which the image processing apparatus 100 extracts drawing-photograph regions from image data.

FIG. 13 is a flowchart showing a procedure in which the image processing apparatus 100 extracts drawing-photograph regions from image data. In FIG. 13, as for some steps which are identical to the steps of FIG. 3, the same symbols are respectively used in FIG. 13 and the explanation about the symbols is omitted. FIG. 13 includes steps S11-S13 and S101, which are different from the case of FIG. 3.

<S11> First, the letter pixel determination unit 32 determines (identifies) letter pixels (symbol pixels) forming letters (symbols). The determination of the letter pixels may be done by a variety of methods. In this case, the following procedure (process) is performed, for example.

<S11-1> A background color is determined for image data to be processed. In general, the background color is widely distributed in the entire document, and the letters 21 have a single color. By taking into consideration this fact, the background color may be determined based on the most dominant color indicated by the most dominant pixel values (the back ground color pixels have the most dominant pixel values). If the background consists of multiple colors, several background colors may be determined based on the order of dominant colors.

<S11-2> Next, a partial region formed by connected pixels, in which the color of the connected pixels are non-background color, is extracted from the image data. From the partial region, a connected region formed by pixels which have the identical color (identical color connected element or identical color connected pixel) is extracted. The identical color connected elements (pixels) are obtained by connecting adjacent pixels which satisfy a requirement with respect to a predetermined color distance range in the color space. This connection process is based on the fact that if two of adjacent pixels have similar colors which are in the range of the predetermined color distance, then the two adjacent pixels are determined to have the identical color. This grouping process is continued for the whole partial region. As a result, pixels in the partial regions are attributed to one of the connection elements.

<S11-3> The feature of the identical color connected element (pixel) is extracted. For example, the number of colors of identical color connected pixels in the partial region is obtained. The number of the colors is compared with a predetermined threshold number, and if the number is greater than the threshold number, the partial region is determined as a photograph region 23. The threshold number may be determined by an experimental method.

<S11-4> The letters 21 are extracted from another region in the partial region in which the other region is not the photograph region. As for extraction of the letters 21, procedures A1-A3 can be used, as described above with respect to the flowchart of FIG. 8.

<S12> Next, the letter elimination unit 33 eliminates the letters 21 from the original image data. The elimination unit 33 replaces the pixel feature values (colors) of the pixels corresponding to the letters 21 with colors of pixels adjacent to the pixels of the letters 21 or colors of pixels surrounding the pixels of the letters 21. The colors to be replaced correspond to the background colors, so that the letter pixels (pixels of the letters 21) are turned into the background colors.

<S13> The reduced image formation unit 31 forms a reduced image from the data after the elimination process. For example, when an image one-fourth the size of the original image is formed (quarter size), each of 4×4 pixels is extracted and the feature values of the 4×4 pixels are averaged. An averaged pixel value of the 4×4 pixels is associated with a single pixel of the reduced image (the quarter size image). Although a down sampling method may be used, it is preferable to use this averaging method for reducing the influence of half tone meshing or fine dots in the image.

<S20-S100> The following processes are similar to those of the first embodiment. A color clustering process and a connection element extraction process are performed for the reduced image. By performing those processes to the reduced image, the number of connecting elements can be reduced.

On the other hand, there are cases in which the feature value extraction should be applied to the original image data, or should be applied to the reduced image data. Normally, an original image is suitable for detecting the degree (certainty) that letter (symbol) pixels forming letters (symbols) are contained in pixels, since the letters (symbols) 21 tend to have fine shapes. In this embodiment, a specific method of extracting letters is not determined. It may be better that the process of extracting letters is applied to reduced images. Further, the processing time for reduced images is shorter than that for an original image, and this fact is the same for the case of the feature value extraction process. Thus, for example, the edge intensity calculation (A1) may be applied to a reduced image, the letter-contained ratio calculation (A2) may be applied to the original image, and the circumscribed rectangular evaluation (A3) may be applied to a reduced image.

<S100> By performing the process from start to step S100, an integrated drawing-photograph region is obtained for a reduced image, and then the pixels of the integrated drawing-photograph region is converted to the pixels of the original image. That is, the address information (coordinate address) of pixels of the reduced image is converted to that of the original image. Since the integrated drawing-photograph region has a rectangular shape, the conversion is performed for the addresses of the four edges.

With the above process, the integrated drawing-photograph region is determined for the original image. The image processing apparatus 100 extracts the integrated drawing-photograph region from the original image (data) and outputs the drawing-photograph region.

The image processing apparatus 100 reduces the size of the image data to be processed, so that the processing time and the usage of memories can be saved.

Fourth Embodiment

In the first embodiment and the third embodiment, the color clustering process is performed. In some cases, an inaccurate (unstable) result of the color clustering process can be obtained as follows.

<Case 1: Numerous Colors are Used in a Document>

The number of cluster colors cannot be increased, because the amount of processing (calculation) increases. Further, if the number of cluster colors is small compared to the number of the original colors, different colors can be classified as the same cluster color even if the different colors should be classified as different cluster colors. In this case, proper candidate regions cannot be obtained.

<Case 2: Gray Image>

In a case of a gray color image, each color is similar and only the brightness of each color is different from one another. In this case, it tends to misclassify different colors as the same cluster color even if the different colors should be classified as different cluster colors. Thus proper candidate regions cannot be obtained.

This embodiment describes an image processing apparatus 100 which can extract drawing-photograph elements from image data having many colors or a gray color image.

Generally, a photograph includes many edges of objects even if it includes many colors. It can be assumed that there are few cases in which a photograph includes a small number of edges, because such a photograph would be out of focus. On the other hand, the line drawing certainly includes edges. Thus, based on edge detection, candidate regions are easily extracted. Further, when both the edge detection and the color clustering process are used to detect candidate regions, it is considered that the possibility of failing to detect candidate regions is reduced.

As for the image processing apparatus 100, the edge detection is performed to extract connecting pixel elements having edges, and the connecting pixel elements are added to drawing-photograph element regions.

In this way, the extraction of candidate regions becomes easier even if the color clustering process is inaccurate, and particularly the extraction of a drawing (line drawing) becomes easier.

Figure 14:
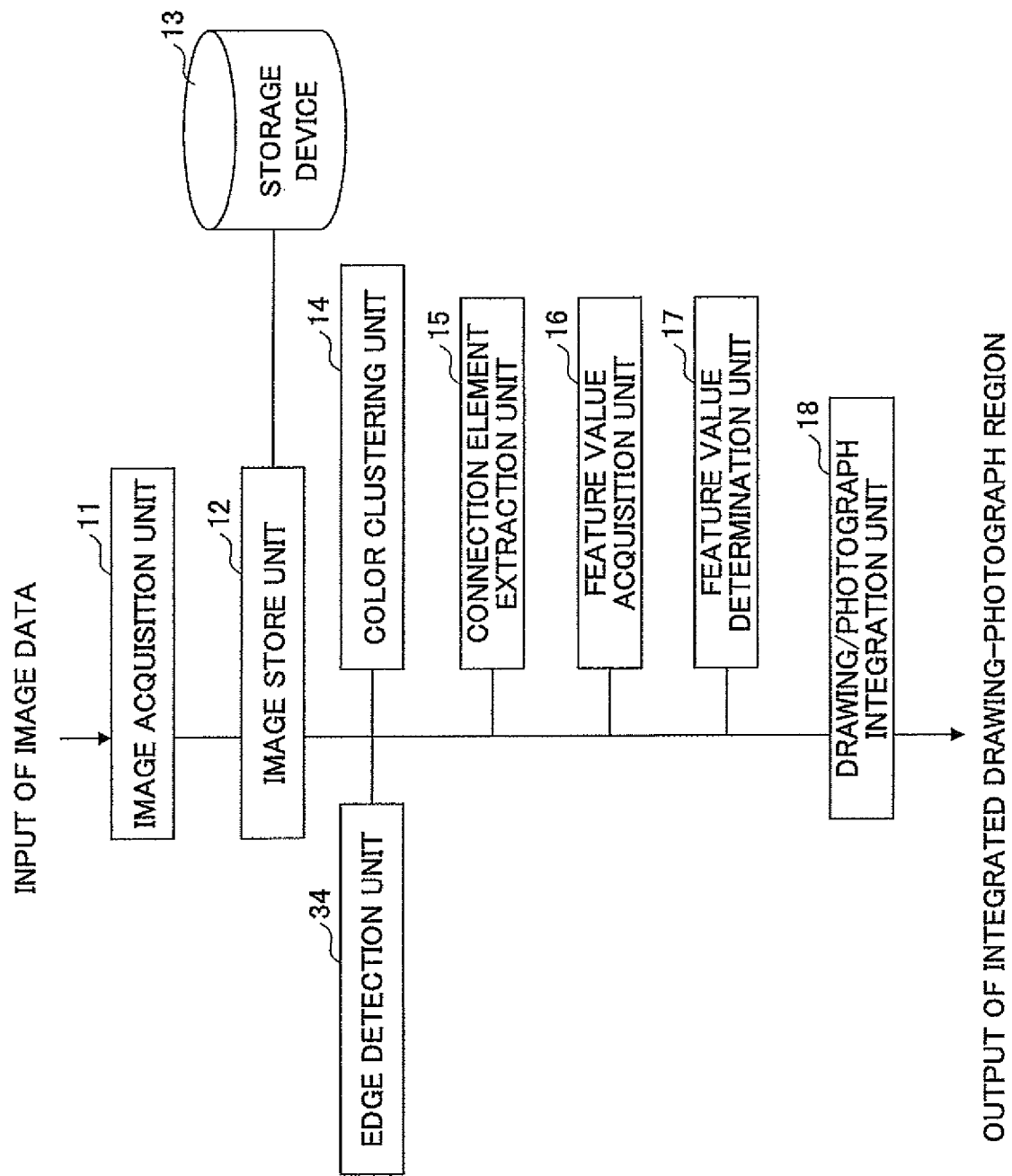
FIG. 14 shows a block diagram of the image processing apparatus 100 (fourth embodiment)

FIG. 14 shows a block diagram of the image processing apparatus 100 of this embodiment. Further, as shown in FIG. 14, as for some parts identical to the parts which are used in FIG. 1, the same symbols are used and the explanation about the symbols is omitted. The image processing apparatus 100 of FIG. 14 includes an edge detection unit 34 which detects edges in image data. The edge detection unit 34 detects edges for each color element, R, G, and B.

Figure 15:
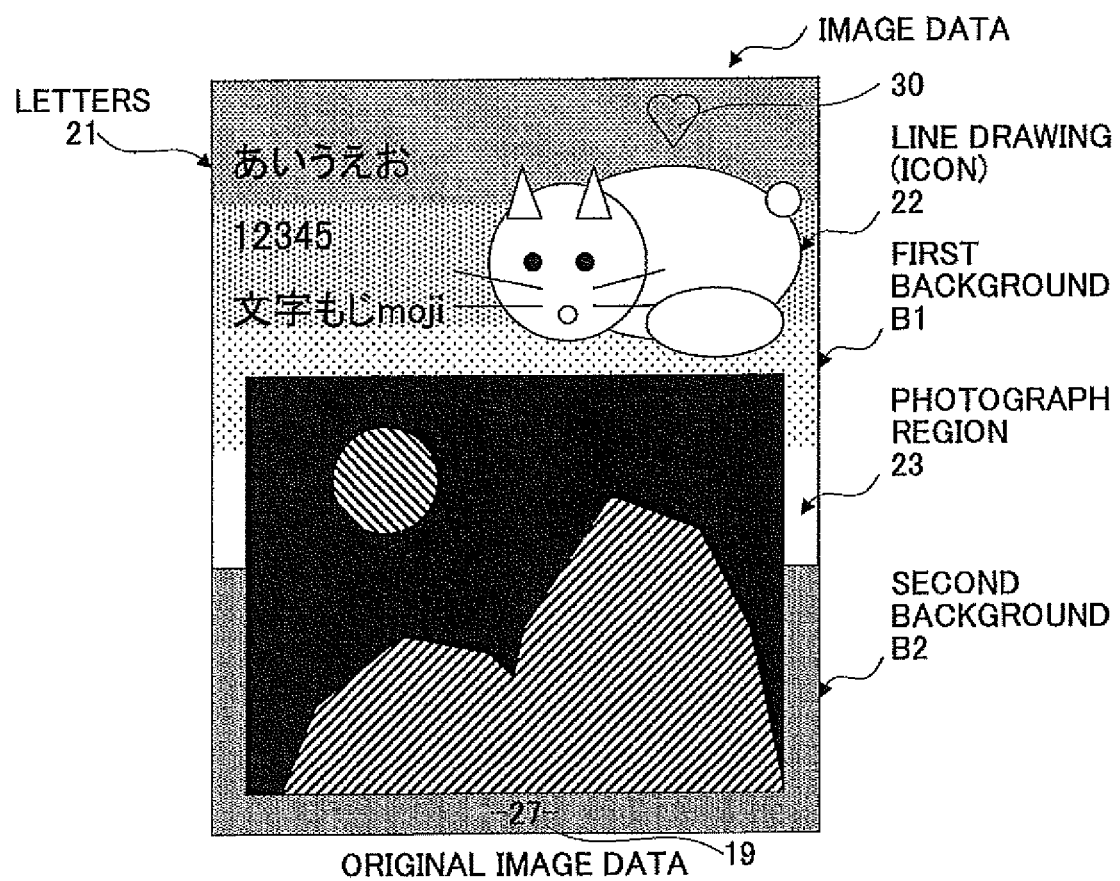
FIG. 15 shows the image data of the original image of this embodiment.
Figure 16:
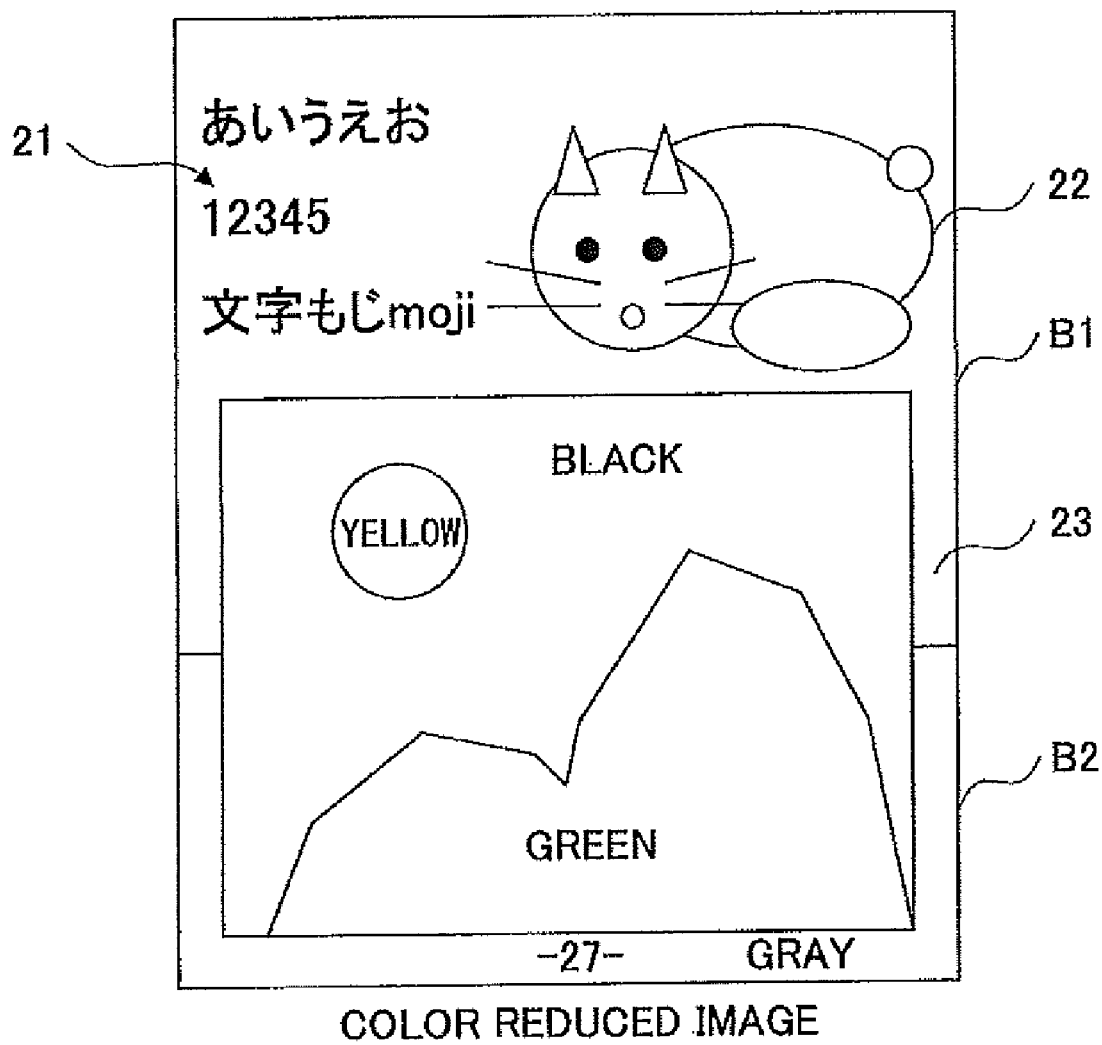
FIG. 16 indicates an example of a reduced image.

FIG. 15 shows the image data of the original image of this embodiment. FIG. 16 indicates reduced images respectively. The image data of this embodiment include a gray heart FIG. 30 above a line drawing 22. The heart FIG. 30 of FIG. 15 has a color similar to a first background B1. Thus, after the color clustering process as described in the first embodiment, the color of the heart FIG. 30 is reduced to the same cluster color as that of the background B1. As a result, the color of the heart FIG. 30 is classified as the white color on the reduced color image as shown in FIG. 16.

Figure 17:
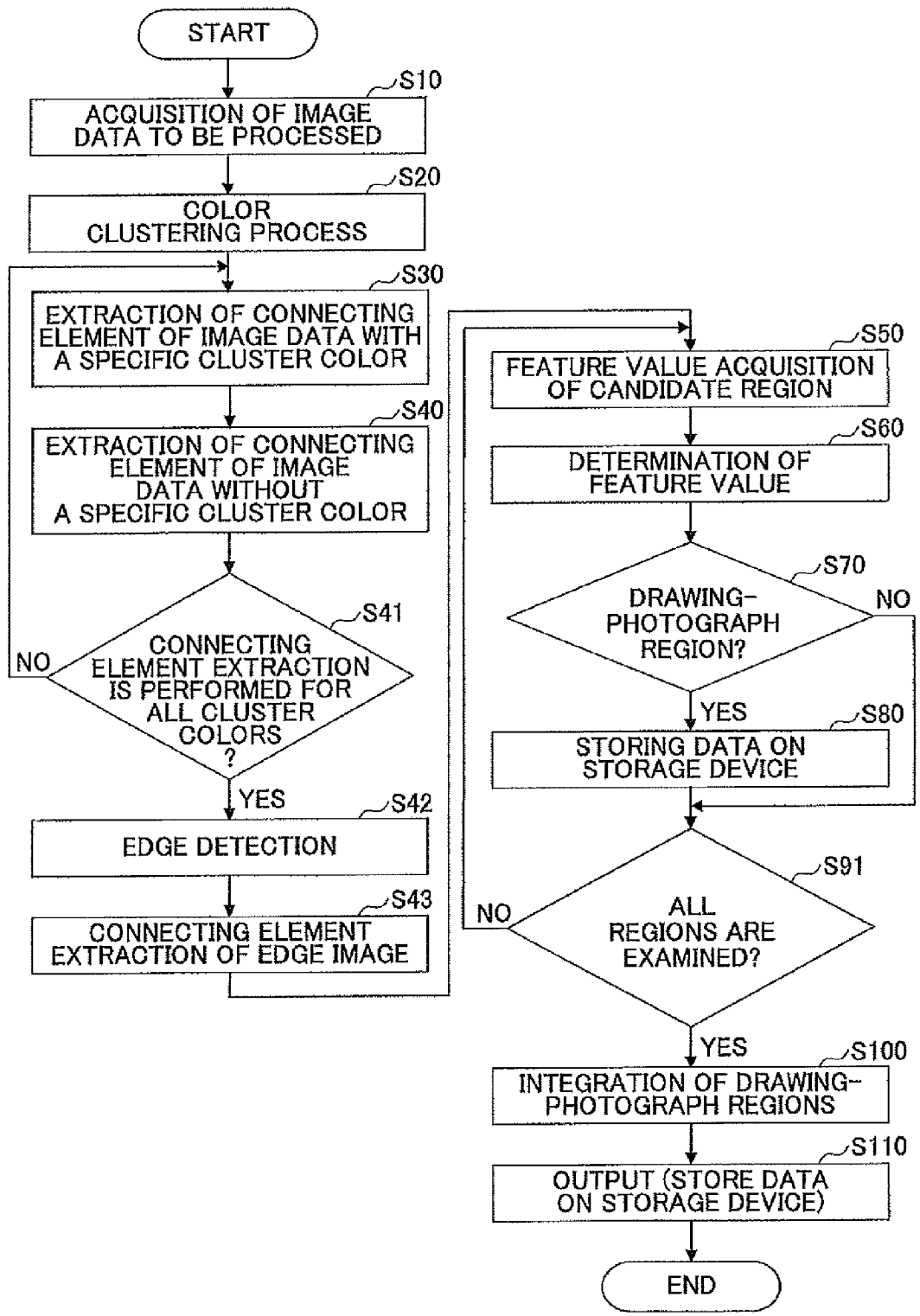
FIG. 17 is a flowchart showing a procedure in which the image processing apparatus extracts drawing-photograph elements from an image (fourth embodiment)

FIG. 17 is a flowchart showing that the image processing apparatus 100 extracts a drawing-photograph element from image data. Further, in FIG. 17, as for some steps identical to the steps which are used in FIG. 3, the same symbols are used and the explanation about the symbols is omitted.

In steps S30 and S40, extraction is performed for connecting pixels having a specific cluster color and the other connecting pixels having other cluster colors without the specific cluster color, as shown in FIG. 6. This procedure is continuously performed for all cluster colors. As a result, connecting elements are extracted based on a color between a white color and the other colors, a black color and the other colors, a yellow color and the other colors, a green color and the other colors, and a gray color and the other colors.

<S42> The edge detection unit 34 detects edge data from "original" image data. The edge detection is performed for each pixel. For example, in case of a gray image data, the space filtering is performed for each pixel with surrounding pixels, in which a pixel of interest is placed at the center with the surrounding pixels (in this example, eight pixels). This space filtering is performed for each pixel. If a result of the space filtering shows an absolute value (number) greater than a predetermined value (number), the pixel is determined to be an edge part. A configuration of the space filtering is shown below as examples.

$$\begin{matrix} -1 & -1 & -1 \\ -1 & 8 & -1 \\ -1 & -1 & -1 \end{matrix} \quad (1)$$

In a case of color image data, the above space filtering process is performed for each color element, R, G, and B of a pixel. If there is one of RGB elements of a pixel that shows a greater value than a predetermined value, the pixel is determined to be an edge part.

As another method, two filter processes may be performed for each of RGB elements of a pixel to obtain two values. Each of the two values is squared and the obtained two values are added. If the added value is greater than a predetermined value (number), the pixel is determined to be an edge part. The space filtering configurations are shown below.

$$\begin{matrix} -1 & -1 & -1 & & -1 & 0 & 1 \\ 0 & 0 & 0 & & -1 & 0 & 1 \\ 1 & 1 & 1 & & -1 & 0 & 1 \end{matrix} \quad (2)$$

There is a tendency that the filter (2) is insensitive for small noise compared to the filter (1). For example, when a background is a medium color formed by fine dots, each dot is not picked as an edge part. This is an advantage compared to the filter (1). Further, the pixels having edges are determined to be black color pixels, and then a binary image is formed.

Figure 18:
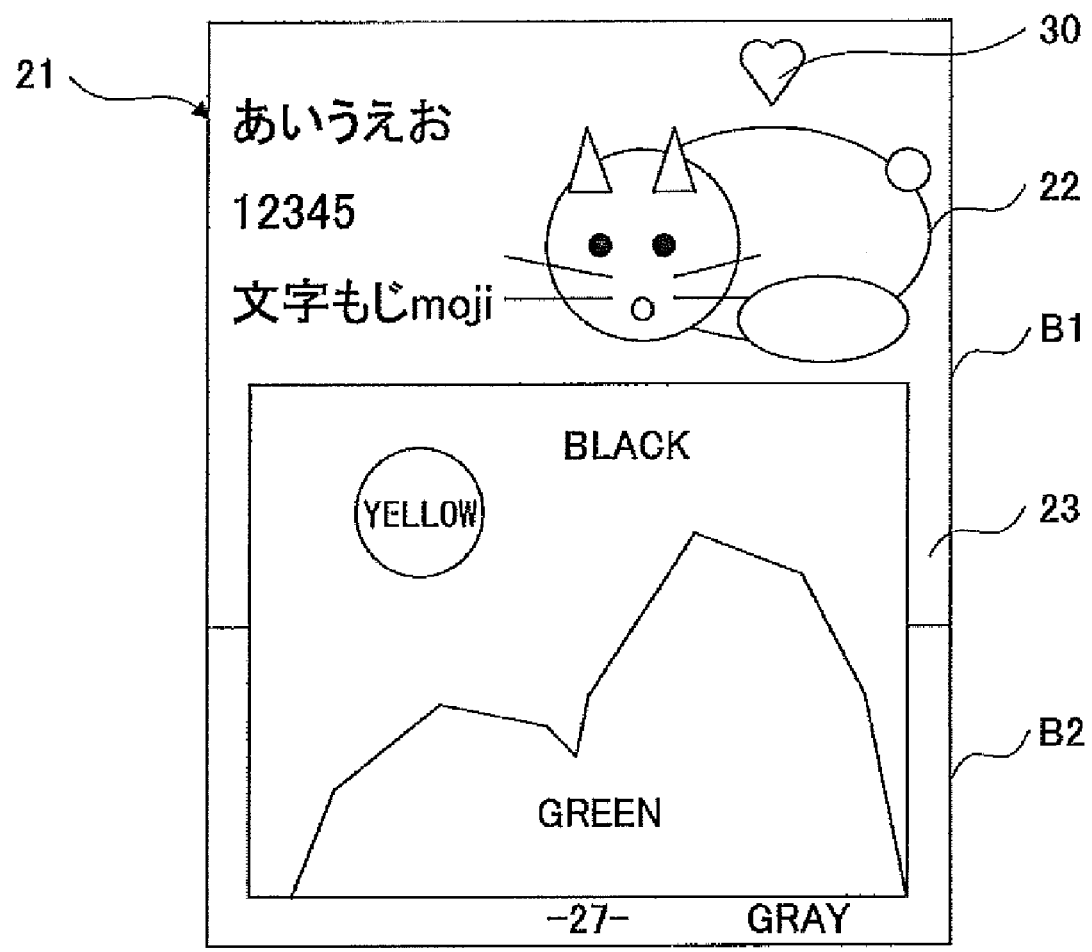
FIG. 18 shows an example of an edge image.

FIG. 18 shows an example of an edge image. The heart FIG. 30 disappears after the color clustering process (FIG. 16). On the other hand, the edge image shows the heart FIG. 30 without disappearing (FIG. 18).

<S43> The connecting element extraction unit 15 extracts a connecting element from the edge image, and adds a circumscribed rectangular shape corresponding to the connecting element as a drawing-photograph element region. As shown in FIG. 16, the gray color of the heart FIG. 30 is relatively close to a white color, and hence the heart FIG. 30 does not become an independent group. For this reason, when the heart FIG. 30 is attempted to be extracted from the reduced color image, a part of the heart FIG. 30 cannot be extracted as a drawing-photograph element region.

However, when extracted from the edge image, the heart FIG. 30 can be extracted as a drawing-photograph element region.

After the above step (procedure), it is followed by the same process as the case of the first embodiment. In step S91, it is determined whether "all of the regions are examined." This step is performed to determine whether all candidate regions for all cluster colors and all candidate regions for an edge image are examined. This step is the same as step S90 (FIG. 3).

Figure 19B:
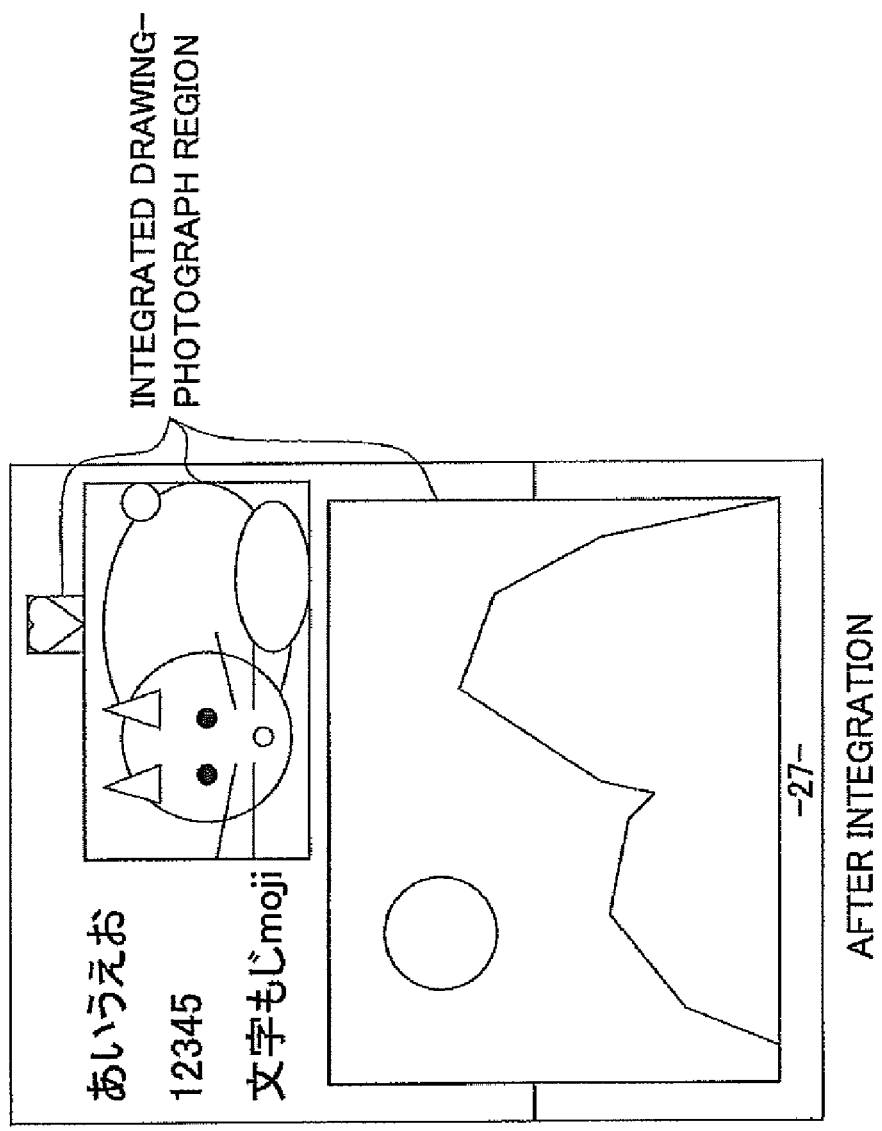
FIG. 19 shows image data having plural drawing-photograph element regions which are encompassed by circumscribed rectangular shapes.

FIG. 19A shows image data in which plural drawing-photograph element regions are indicated with rectangular shapes. In FIG. 19A, it is found that the heart FIG. 30 is extracted. FIG. 19B shows image data in which the drawing-photograph element regions are integrated. Since the heart FIG. 30 is not overlapped with other drawing-photograph element regions, the heart FIG. 30 exists separately as an integrated drawing-photograph region.

According to this embodiment, the effect of the first embodiment is added. In this case, even if the color clustering process is performed inaccurately, the candidate region is extracted with the edge image, and thus drawings and photographs can be extracted from image data having numerous colors without an increase of the cluster colors. Thus, extraction failure can be reduced.

Fifth Embodiment

In the fourth embodiment, both the color clustering process and the edge detection are performed. With only the image obtained by the edge detection, a drawing-photograph element region can be extracted. With this, processing time can be reduced since the color clustering process is omitted.

Figure 20:
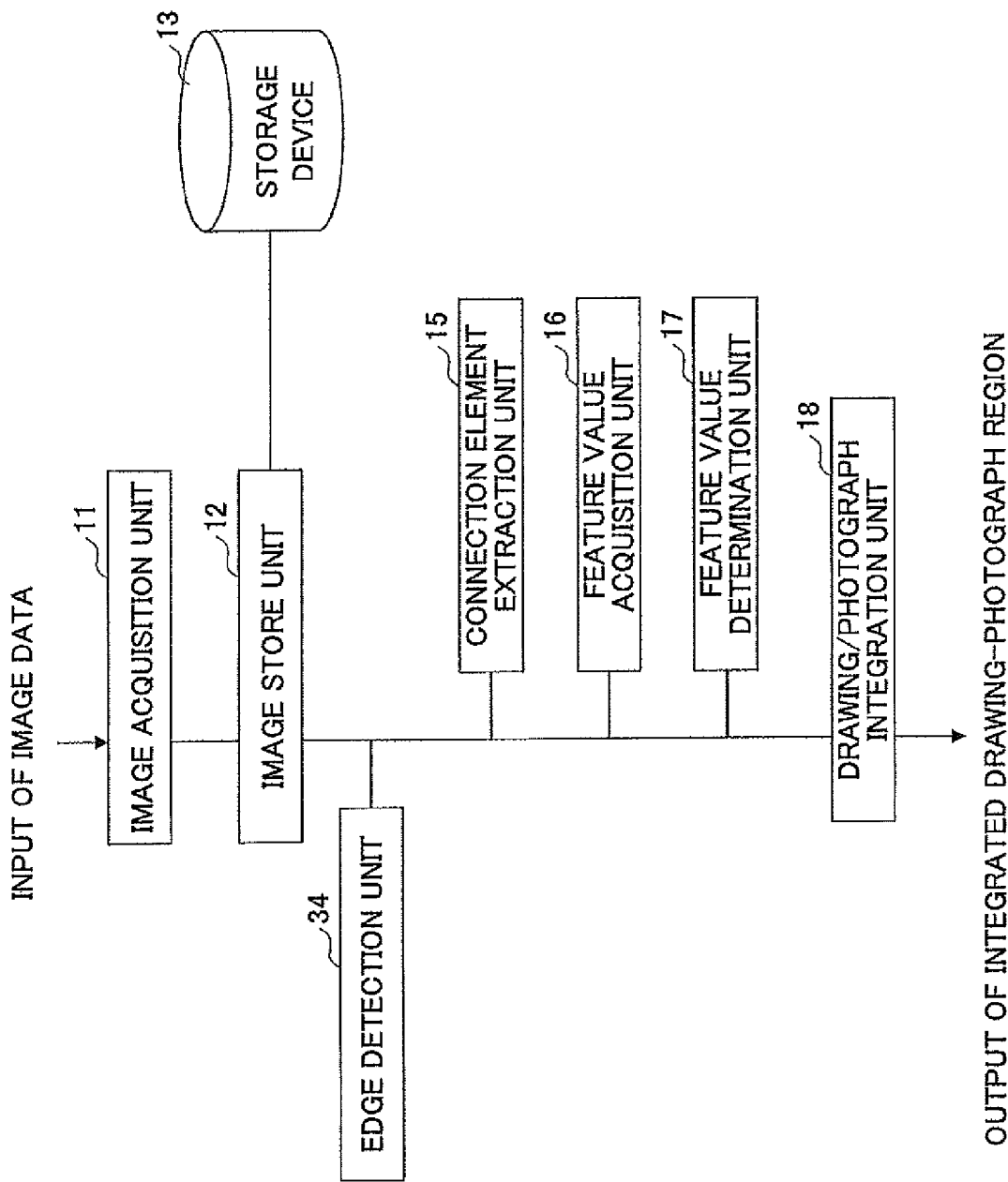
FIG. 20 shows a block diagram of the image processing apparatus 100 (fifth embodiment)

FIG. 20 shows a block diagram of an image forming apparatus 100 of this embodiment. Further, in FIG. 20, as for some parts identical to the parts which are used in FIG. 14, the same symbols are used and the explanation about the symbols is omitted. The forming apparatus 100 of FIG. 20 does not include the color clustering process unit 14. This is different from the case of FIG. 14.

Figure 21:
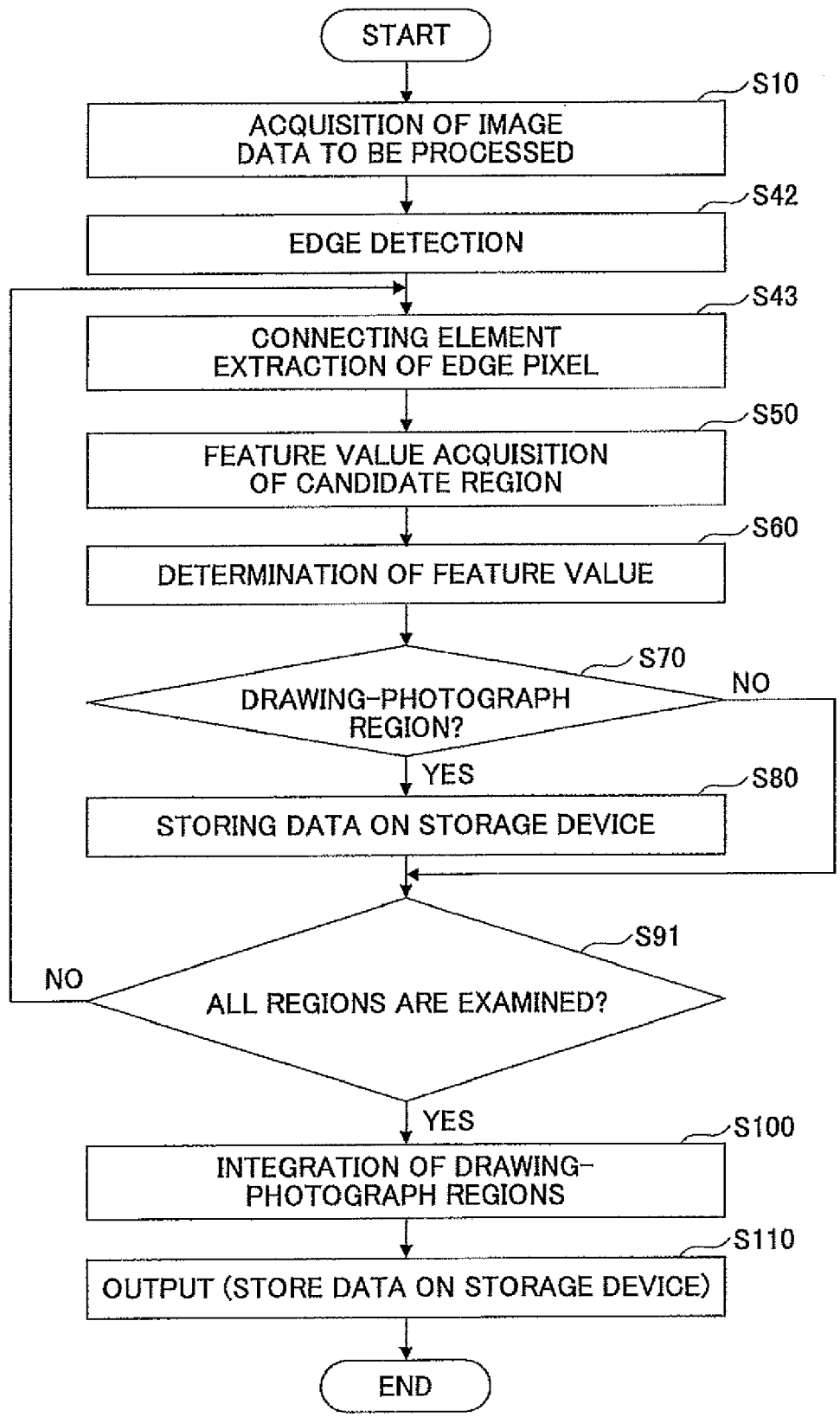
FIG. 21 is a flowchart showing a procedure that the forming apparatus 100 extracts a drawing-photograph element region (fifth embodiment)

Further, FIG. 21 is a flowchart showing a procedure for which the forming apparatus 100 extracts a drawing-photograph element region. In FIG. 21, as for some parts identical to the parts which are used in FIG. 17, the same symbols are used and the explanation about the symbols is omitted. In FIG. 21, the color clustering process (S20), and the extraction process (S30-S41) of connecting pixel elements for each specific cluster color is not included. The rest of the process of FIG. 21 is the same as the case of FIG. 17.

According to the image processing apparatus 100, the effect of the fourth embodiment can be added. Also, the processing time can be reduced since the color clustering process is omitted.

[Configuration of Image Processing Apparatus 100]

Figure 22:
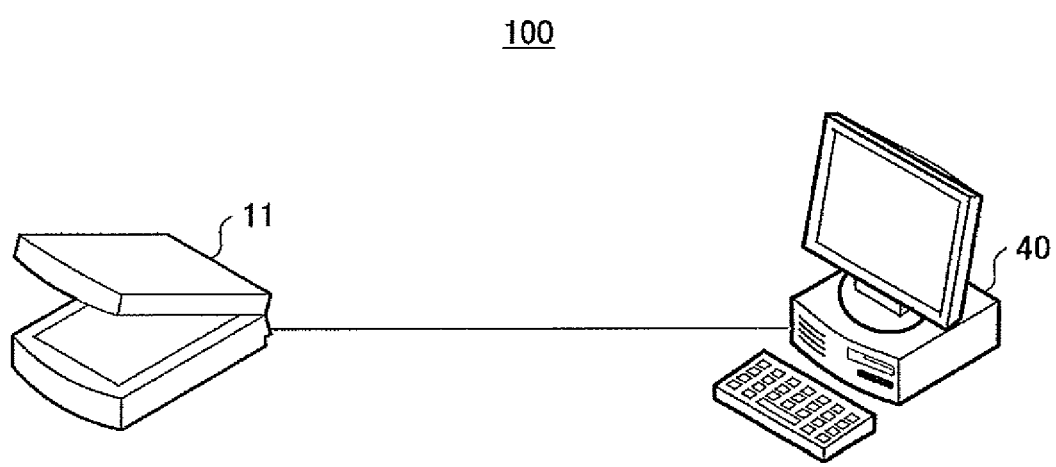
FIG. 22 shows an example of a configuration of the image processing apparatus.

FIG. 22 shows an example of a configuration of the image processing apparatus 100. The image processing apparatus 100 includes an image acquisition unit 11 separately, and a PC 40 connected to the image acquisition unit 11 via a network or connected to the image acquisition unit 11 directly. The processes described in the first embodiment through the fifth embodiment are achieved by use of the hardware configuration of the PC 40 in cooperation with software. Further, as described above, for example, a MFP alone may achieve the image processing apparatus 100.

FIG. 23 shows a hardware configuration of the PC 40. The PC 40 is configured with a CPU 401, a memory (RAM) 402 providing a work area, a hard drive unit 403 (corresponding to the storage device 13 of FIG. 1), an input device 404 such as a keyboard and a mouse, a CD-ROM drive 405, and a display unit 406, in which those are connected via a bus or the like.

The hard drive unit 403 stores a program 41 to be executed by the CPU 401 for operating an image storage unit 12, a color clustering unit 14, a connecting element extraction unit 15, a feature value acquisition unit 16, a feature value determination unit 17, a drawing-photograph integration unit 18, a reduced image formation unit 31, a letter element determination unit 32 (symbol element determination unit), a letter elimination unit 33 (symbol elimination unit), and an edge detection unit 34.

The CPU 401 reads the program 41 out from the hard drive unit and executes the program for achieving each unit. With each unit, an integrated drawing-photograph region is extracted from the image data obtained by the image acquisition unit 11. If necessary, the extracted drawing-photograph region is output on the display unit 406 or printed with a printer 408. Further the extracted drawing-photograph region may be output to be used by another software application (application software) executed on the another PC connected via a network.

Further, the program 41 is provided with a recording medium such as a CD-ROM, and installed on the hard disk drive 403 from a recording medium 407.

[Reuse of Drawing-Photography Element]

An embodiment is described about reuse of an extracted integrated drawing-photograph region. The extracted integrated drawing-photograph region is reused for preparation of a new document. The image processing apparatus 100, which can easily reuse the integrated drawing-photograph region, is described.

FIG. 24 shows an example of a block diagram of the image processing apparatus 100 which is configured to reuse a drawing-photograph region. The hardware configuration of the image processing apparatus 100 is similar to that of FIG. 23. The CPU 401 of the PC 40 executes the program 41 for providing an image display unit 51 configured to display the image of image data, an operation acquisition unit 52 for obtaining user operation inputs which is made by a user in response to the displayed image, an integrated drawing-photograph region display unit 53 configured to display an extracted integrated drawing-photograph region, an integrated drawing-photograph cut-out unit 55 configured to extract the extracted integrated drawing-photograph region from image data, and an external application association unit 54 for associating with another application that newly prepares a new document.

Further, the integrated drawing-photograph region extraction unit 50 includes respective units which are described in the first embodiment through the fifth embodiment. In response to the user operation obtained by the operation acquisition unit 52, the integrated drawing-photograph region extraction unit 50 extracts the integrated drawing-photograph region from the image data by performing the first embodiment through the fifth embodiment.

Thus, the program 41 stored on the hard disk drive 403 achieves the integrated drawing-photograph region extraction unit 50, the image acquisition unit 11, the image display unit 51, the operation acquisition unit 52, the integrated display unit 53, the application association unit 54, and the integrated drawing-photograph cut-out unit 55.

In the following, with respect to reuse of the integrated drawing-photograph region, which is provided by the image processing apparatus 100, an example of execution of the application of FIG. 25 is described based on the flowchart of FIG. 2. First, the application program starts (S210) automatically in response to an operation of a user or input of an image with the image acquisition unit 11. Further, the application program may start when a user designates a file name of image data stored on the hard disk drive 403 with a mouse or the like, and then an automatic extracted application linked to the file name starts.

Figure 25A:
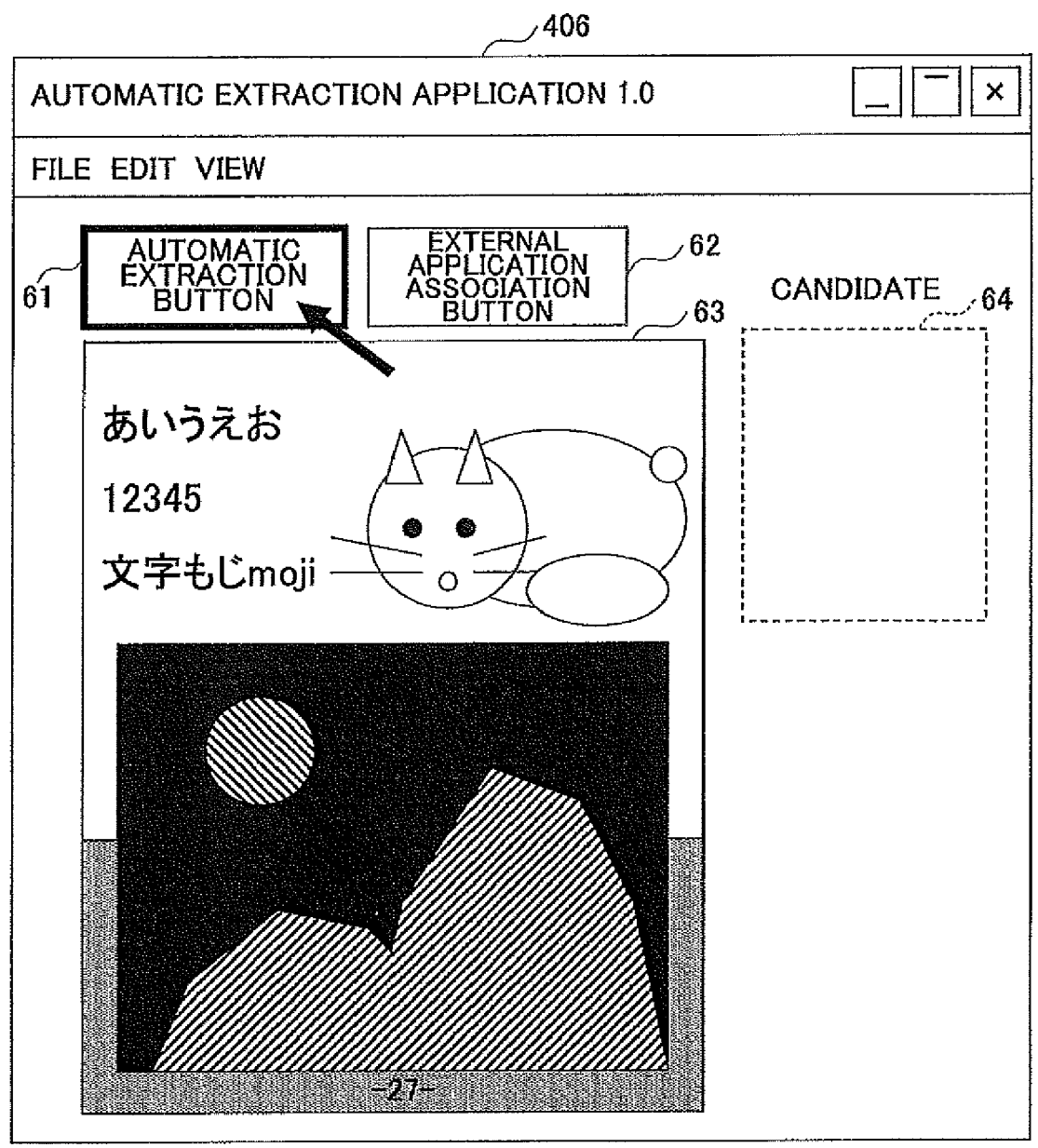
FIG. 25A shows a GUI (Graphical User Interface) of the application program displayed on the display unit 406.
Figure 25B:
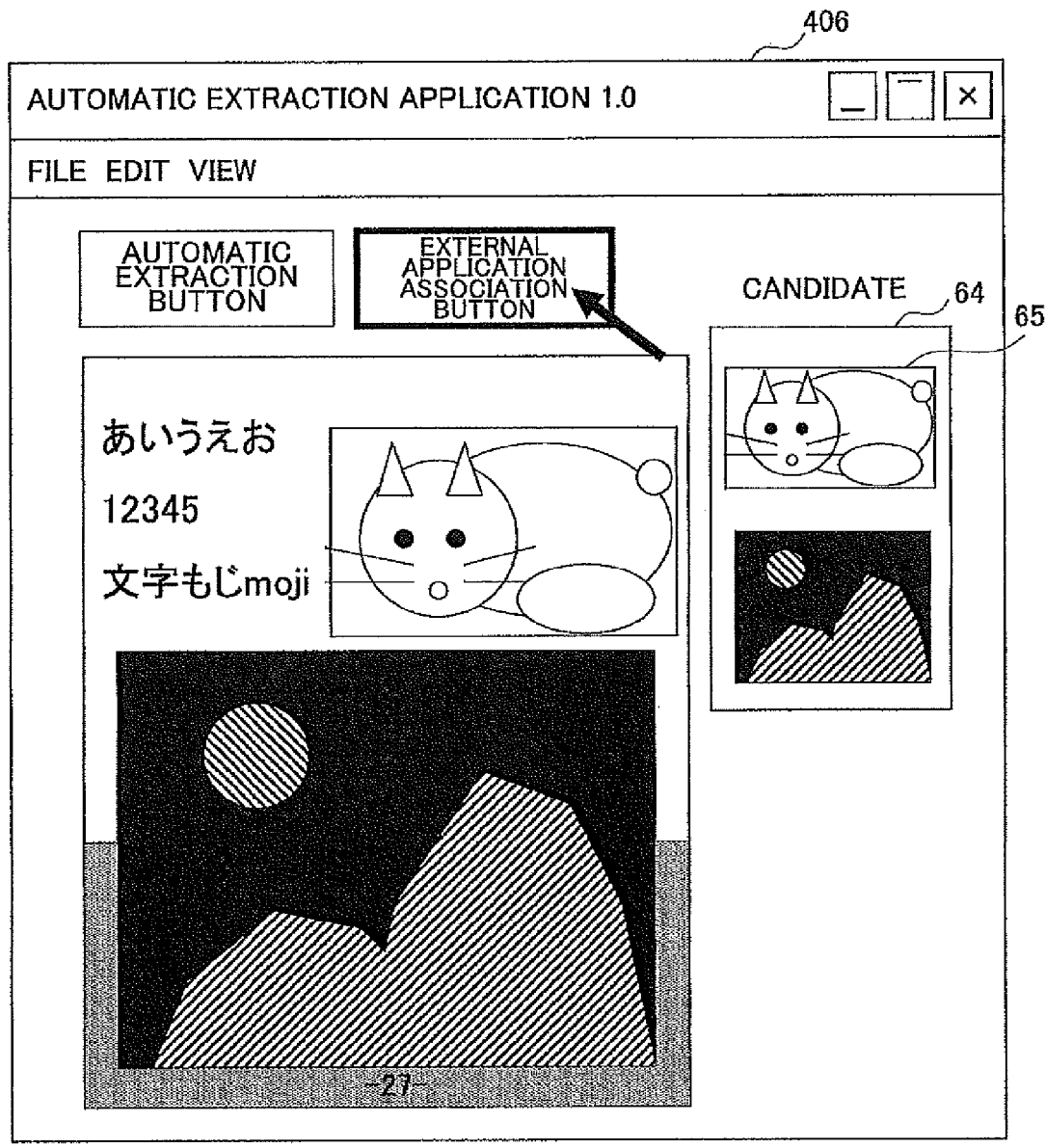
FIG. 25B shows an example showing the image data and the integrated drawing-photograph region on the GUI.
Figure 25C:
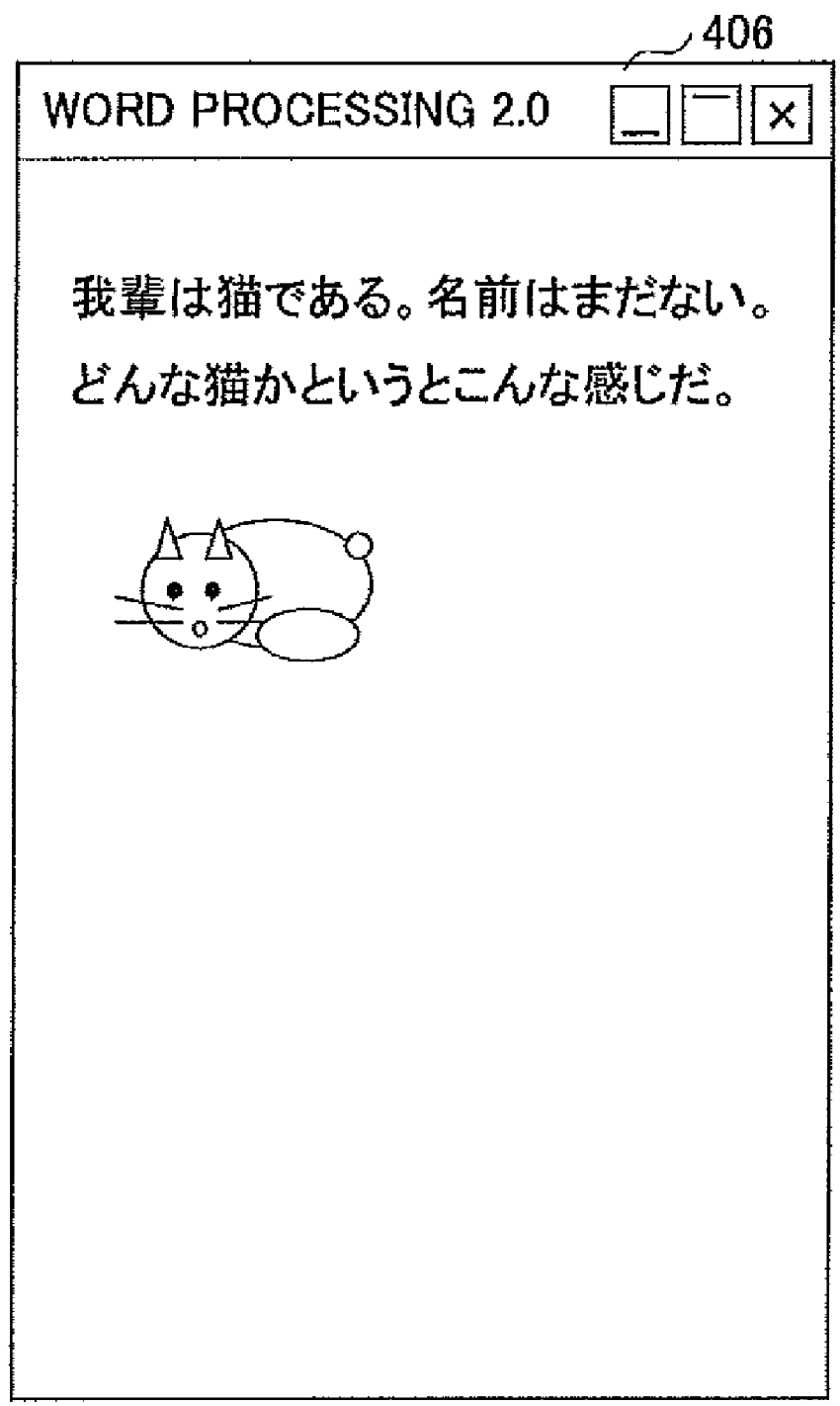
FIG. 25C shows the GUI of the word processing application indicated on the display 406.

FIG. 25A shows a GUT (Graphical User Interface) of the application program displayed on the display unit 406. In FIGS. 25A through 25C, the application program is assumed to be an automatic extraction program. The automatic extraction program includes an automatic cut-out function that detects and cuts out the line drawing 22 from image data to be processed (corresponds to the integrated drawing-photograph region extraction unit 50).

On the GUT of the automatic extraction program, buttons 61, 62, an image data display column 63, and a candidate column 64 are formed, and image data are indicated on the image data display column 63. The button 61 is an "automatic extraction button" for extracting the integrated drawing-photograph region. The button 62 is an "application associating button" for associating with another application. With the button 62, another application may be preliminarily registered as an automatic extraction application. Applications which can be associated with may be displayed in a list every time the button 62 is used.

Next, the image display unit 51 displays image data on the image data display column 63 (S220) There are two procedures to show the image data. When a user designates a file of image data listed in "file" column of the automatic extraction application by use of a pointing device such as a mouse, the image data are displayed in the image data display column 63. Further, prior to starting the automatic extraction application, if the user designates a file name of image data with a mouse or the like, the image data are displayed in the image data display column 63 when the automatic extraction application starts automatically.

As shown in FIG. 25A, while the image data are displayed on the image data display column 63, if the button 62 is selected with a mouse or the like, the operation acquisition unit 52 obtains the operation content that extracts the integrated drawing-photograph region, and the integrated drawing-photograph region extraction unit 50 extracts the integrated drawing-photograph region (S230) according to the method described in the first embodiment through the fifth embodiment.

After the integrated drawing-photograph region extraction unit 50 extracts the integrated drawing-photograph region, the integrated drawing-photograph region display unit 53 displays the integrated drawing-photograph region extracted in the candidate column 64 (S240).

FIG. 25B shows an example showing the image data and the integrated drawing-photograph region on the GUI. The user can recognize the indicated integrated drawing-photograph region, and with a mouse or the like, selects a part which the user wants to reuse from the extracted drawing-photograph region.

Further, when only another part which is not the integrated drawing-photograph region is selected, the user designates the integrated drawing-photograph region from the image data display column 63. In this case, the integrated drawing-photograph region extraction unit 50 can perform the color clustering process for only the selected region. With this, the extraction of the integrated drawing-photograph region becomes easier. Further, for easy extraction of the integrated drawing-photograph region, when the drawing-photograph element region is determined by use of the weighted linear combination and a threshold value of respective feature values of A1-A3, it is preferred to set the threshold value to a small value. By setting the threshold value to be a small value, the determination of the drawing-photograph region is roughened and it becomes easier to extract the drawing-photograph element region. In this case, even if another part which is not the drawing-photograph element region is extracted, such a part may be omitted from reuse, so practically there is no inconvenience.

The operation acquisition unit 52 detects the integrated drawing-photograph region (S250) which is selected by the user from the integrated drawing-photograph region displayed in the candidate column 63. After detecting the integrated drawing-photograph region which is selected by the user, the operation acquisition unit 52 transmits the image display unit 51 the selected integrated drawing-photograph region. With this, the selected integrated drawing-photograph region is indicated in an emphasized manner, and the user can recognize the selected integrated drawing-photograph region. In FIG. 25B, the selected integrated drawing-photograph region is encompassed with a rectangular shape 65 for emphasis indication.

Next, in response to the operation by the user, the integrated drawing-photograph region cut-out unit 55 cuts out the selected integrated drawing-photograph region from the image data (S260). When the user operates the button 62 to reuse the selected integrated drawing-photograph region with another application, the integrated drawing-photograph region cut-out unit 55 extracts the pixel values of pixels corresponding to the region of the integrated drawing-photograph region from the image data. With this process, the integrated drawing-photograph region is copied from the image data.

Next, in response to the operation of the button 62, the application association unit 54 requests a predetermined associated application to start (S270). The predetermined application is previously registered (associated) to the automatic extraction application as an application that corresponds to the automatic extraction application. If the two or more registered applications exist, plural available applications are displayed by pop-up indication. Further, if no application that corresponds with the automatic extraction application is registered, the application association unit 54 queries an OS (operation system) if there is an application that corresponds with the automatic extraction application, and if there is, the corresponding application is started. In this embodiment, for example, a word processing application is started.

When another application is started, the application association unit 54 transmits the extracted drawing-photograph region to the word processing application (external document formation unit) (S280). With this, the process is transferred to the word processing application, and the word processing application displays the transmitted integrated drawing-photograph region at a predetermined position (e.g. below the input line).

FIG. 25C shows the GUT of the word processing application indicated on the display 406. In FIG. 25C, the GUT of the word processing application displays text and the integrated drawing-photograph region. Thus, the user can reuse the integrated drawing-photograph region with the word processing application.

Figure 26:
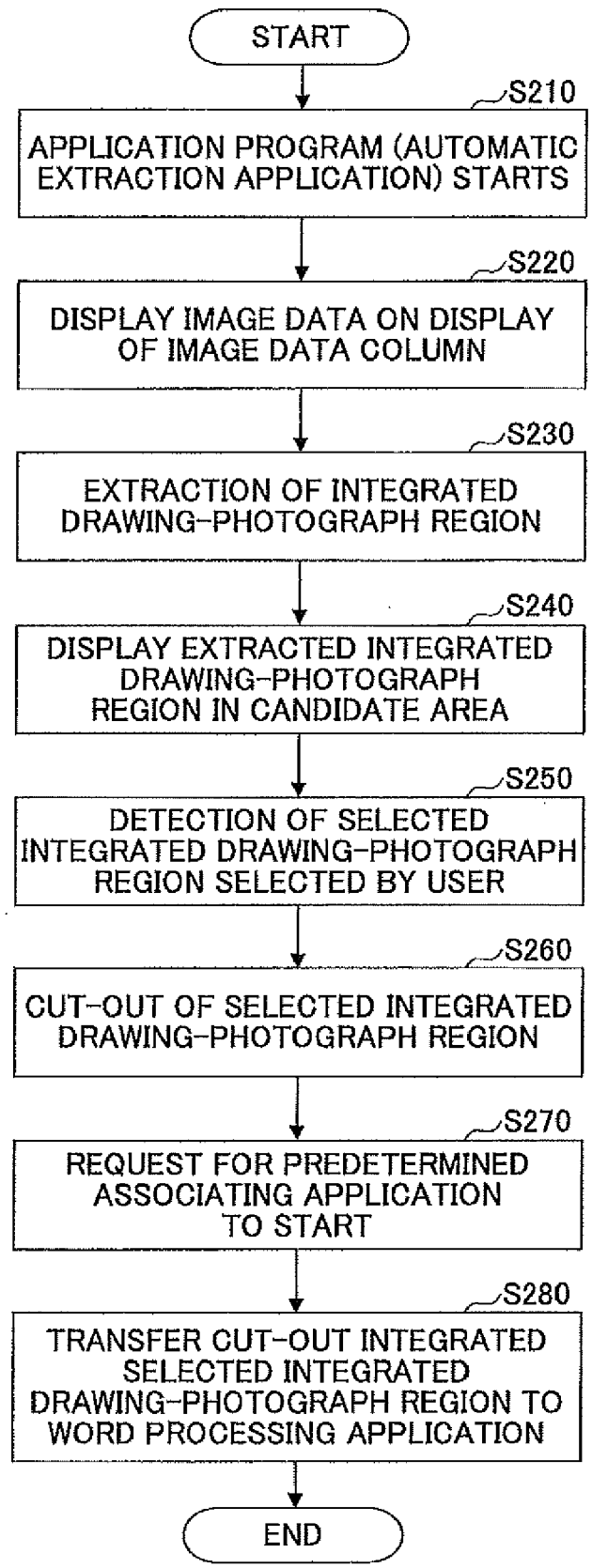
FIG. 26 is a flowchart showing a procedure of reuse of the integrated drawing-photograph region provided with the forming apparatus 100.

Further, in FIGS. 25 and 26, the integrated drawing-photograph region is extracted from one image data set and reused in another application. The integrated drawing-photograph region may be extracted in advance, and stored on the hard disk drive 403. In this case, the user designates a file name of the image data set from a file list with a mouse or the like in advance, and instructs the integrated drawing-photograph region extraction unit 50 to extract all of the integrated drawing-photograph regions of image data. The automatic extraction application may be run or not. The integrated drawing-photograph region extraction unit 50 stores the extracted integrated drawing-photograph region on the hard disk drive 403 by assigning different file names. Thus, the user can select a predetermined integrated drawing-photograph region from the extracted integrated drawing-photograph region having been previously stored on the hard disk drive.

As described above, the image processing apparatus 100 of this embodiment can extract a drawing-photograph region automatically, and allows easy reuse of the drawing-photograph region with another application.

According to this embodiment, picture element values (pixel values) of image data are replaced with plural representative picture values according to the values of the picture elements, and regions including letters are excluded for each region having the same representative picture value, and thus it is possible that drawing regions or photograph regions can be stably extracted from image data if more than one color is included as a background color.

Further, as one of aspects of this embodiment, the image processing apparatus includes an edge detection unit which detects edge information from image data before replacing the image data with a representative color, and the candidate region extracting unit extracts candidate regions from regions where edge information continues in series.

According to this embodiment of the invention, it is unnecessary to increase number of cluster colors, and thus drawing regions or photograph regions can be extracted stably (accurately) from image data which include many colors or from gray image data without increasing of the calculation load (processing load).

According to the embodiment of this invention relating to an image processing apparatus which extracts photographs or drawings from image data, it becomes possible to provide an image processing apparatus, an image processing method, an image processing means and a computer-readable recording medium which can stably extract photographs or drawings from image data even if the image data include a background with more than one color such as a gradation color.

Another aspect of the present invention may be to provide an image processing method including the steps of:

detecting edge information from the original pixel values of the image data, the edge information indicating presence of an edge;

wherein the extracting step extracts one or more regions each containing contiguous pixels having the edge information as one or more of the candidate regions in the image data having pixel values replaced with the plural representative pixel values.

Another aspect of the present invention may be to provide an image processing method including the step of: the replacing step performs a color clustering process.

Another aspect of the present invention may be to provide an image processing method including the step of: wherein when the image data are color image data in which each of pixels of the color image data has plural color elements, the replacing step quantizes pixel values of the pixels of the color image data for each of the plural color elements and creates a quantized pixel value histogram for each of the plural color elements, the plural representative pixel values are obtained by selecting, from the quantized pixel values, a predetermined number of quantized pixel values that appear more frequently in the quantized pixel value histogram than the remaining quantized pixel values, and each of the pixel values of the image data not being quantized is replaced with one of the plural representative pixel values being closest to said each of the pixel values.

Another aspect of the present invention may be to provide an image processing method including the step of: wherein the extraction step performs extraction of only plural pixels that are adjacent to each other and have the same representative pixel value from the image data in which the original pixel values are replaced with the representative pixel values, and the extracting step continues to perform the extraction for the plural candidate regions.

Another aspect of the present invention may be to provide an image processing method including the steps of: wherein the determining step acquires edge intensity information of each of the candidate regions, letter candidate region accuracy information based on a series of candidate regions having a predetermined separation or less and circumscribed rectangular shape information of each of the candidate regions, and the acquiring determines, when the edge intensity information, the letter candidate region accuracy information and the circumscribed rectangular shape information do not satisfy predetermined requirements, that the candidate regions include the drawing-photograph pixels.

Another aspect of the present invention may be to provide an image processing method including the steps of:

a detecting step detects, before the original pixel values of the image data are replaced with the plural representative pixel values by the pixel value replacement unit, symbol pixels forming symbols from the image data; and an symbol eliminating step replaces, before the original pixel values of the image data are replaced with the plural representative pixel values by the pixel value replacement unit, pixel values of the symbol pixels with adjacent pixel values of pixels adjacent to the symbol pixels, wherein the replacing step replaces the pixel values of the image data replaced by the symbol eliminating step with the plural representative pixel values.

Another aspect of the present invention may be to provide an image processing method including the steps of:

wherein a symbol determining step extracts pixel values of identical color connected pixels from pixel values of non-background color pixels determined according to the image data, if a number of the identical color connected pixels is greater than a predetermined threshold number, the symbol determining step assumes that the identical color connected pixels correspond to a photograph region, and with respect to other identical color connected pixels excluded from the photograph region, the symbol determining step determines the symbol pixels based on edge intensity information, letter candidate region accuracy information based on a series of candidate regions having a predetermined separation or less, and circumscribed rectangular shape information of the identical color connected pixels.

Another aspect of the present invention may be to provide an image processing method including the steps of:

a forming step forms reduced image data from the image data in which the symbol eliminating step has replaced the pixel values of the symbol pixels, wherein the pixel value replacement unit replaces pixel values of the reduced image data with the plural representative pixel values based on the pixel values of the reduced image data.

Another aspect of the present invention may be to provide an image processing method including the steps of:

displaying an integrated drawing-photograph region of image data on a display unit;

cutting out the integrated drawing-photograph region from the image data; and transmitting the integrated drawing-photograph region to an external document formation unit that forms a new document.

Another aspect of the present invention may be to provide an image processing apparatus for extracting, from image data, drawing-photograph pixels forming a drawing or a photograph, the image processing apparatus including:

means for detecting edge information from the original pixel values of the image data, the edge information indicating presence of an edge;

wherein the candidate region extraction means extracts one or more regions each containing contiguous pixels having the edge information as one or more of the candidate regions in the image data having pixel values replaced with the plural representative pixel values.

Another aspect of the present invention may be to provide an image processing apparatus for extracting, from image data, drawing-photograph pixels forming a drawing or a photograph, the image processing apparatus including; the replacing means performs a color clustering process.

Another aspect of the present invention may be to provide an image processing apparatus for extracting, from image data, drawing-photograph pixels forming a drawing or a photograph, the image processing apparatus, wherein when the image data are color image data in which each of pixels of the color image data has plural color elements, the pixel value replacement means quantizes pixel values of the pixels of the color image data for each of the plural color elements and creates a quantized pixel value histogram for each of the plural color elements, the plural representative pixel values are obtained by selecting, from the quantized pixel values, a predetermined number of quantized pixel values that appear more frequently in the quantized pixel value histogram than the remaining quantized pixel values, and each of the pixel values of the image data not being quantized is replaced with one of the plural representative pixel values being closest to said each of the pixel values.

Another aspect of the present invention may be to provide an image processing apparatus for extracting, from image data, drawing-photograph pixels forming a drawing or a photograph, the image processing apparatus: wherein the candidate region extraction means performs extraction of only plural pixels that are adjacent to each other and have the same representative pixel value from the image data in which the original pixel values are replaced with the representative pixel values, and the candidate region extraction means continues to perform the extraction for the plural candidate regions.

Another aspect of the present invention may be to provide an image processing apparatus for extracting, from image data, drawing-photograph pixels forming a drawing or a photograph, the image processing apparatus, wherein the feature value determination means acquires edge intensity information of each of the candidate regions, letter candidate region accuracy information based on a series of candidate regions having a predetermined separation or less and circumscribed rectangular shape information of each of the candidate regions, and the feature value acquisition means determines, when the edge intensity information, the letter candidate region accuracy information and the circumscribed rectangular shape information do not satisfy predetermined requirements, that the candidate regions include the drawing-photograph pixels.

Another aspect of the present invention may be to provide an image processing apparatus, the image processing apparatus, further including, detecting means detects, before the image data are replaced with the plural representative pixel values by the pixel value replacement unit, symbol pixels forming symbols from the image data; and symbol eliminating step replaces, before the image data are replaced with the plural representative pixel values by the replacing step, pixel values of the symbol pixels with adjacent pixel values of pixels adjacent to the symbol pixels, wherein the replacing means replaces the pixel values of the image data replaced by the symbol eliminating means with the plural representative pixel values based on the plural predetermined threshold pixel values.

Another aspect of the present invention may be to provide an image processing apparatus for extracting, from image data, drawing-photograph pixels forming a drawing or a photograph, the image processing apparatus including, wherein a symbol pixel determination means detects, before the original pixel values of the image data are replaced with the plural representative pixel values by the pixel value replacement unit, symbol pixels forming symbols from the image data; and a symbol elimination means replaces, before the original pixel values of the image data are replaced with the plural representative pixel values by the pixel value replacement means, pixel values of the symbol pixels with adjacent pixel values of pixels adjacent to the symbol pixels, wherein the pixel value replacement means replaces the pixel values of the image data replaced by the symbol elimination unit with the plural representative pixel values.

Another aspect of the present invention may be to provide an image processing apparatus for extracting, from image data, drawing-photograph pixels forming a drawing or a photograph, the image processing apparatus including, a reduced image formation means configured to form reduced image data from the image data in which the symbol elimination means has replaced the pixel values of the symbol pixels, wherein the pixel value replacement means replaces pixel values of the reduced image data with the plural representative pixel values based on the pixel values of the reduced image data.

Another aspect of the present invention may be to provide an image processing apparatus for extracting, from image data, drawing-photograph pixels forming a drawing or a photograph, the image processing apparatus including, means for displaying an integrated drawing-photograph region of image data on a display means;

means for cutting out the integrated drawing-photograph region from the image data; and means for transmitting the integrated drawing-photograph region to an external document formation means that forms a new document.

The present invention is not limited to the specifically disclosed embodiments, and variations and modifications may be made without departing from the scope of the present invention.

The present application is based on Japanese priority application No. 2008-019724 filed Jan. 30, 2008, the entire contents of which are hereby incorporated herein by reference.

What is claimed is:

1. An image processing apparatus which extracts, from image data, drawing-photograph pixels forming a drawing or a photograph, the image processing apparatus comprising:
   a pixel value replacement unit configured to replace original pixel values of image data with plural representative pixel values based on the original pixel values;
   a candidate region extraction unit configured to extract plural candidate regions, wherein each of the plural candidate regions is formed by a rectangular shape, and includes plural pixels being adjacent to each other and each of the plural pixels has the same representative pixel value;
   a feature value acquisition unit configured to acquire a feature value of each of a plurality of parameters indicating certainty that symbol pixels forming symbols are contained in each of the plural candidate regions;
   a feature value determination unit configured to determine that each of the plural candidate regions in which the symbols are contained based on the feature value does not include the drawing-photograph pixels, and
   an integration unit configured to integrate other candidate regions that are determined to have the drawing-photograph pixels and that have an overlapping part,
   wherein at least one of the above units are implemented by a processor,
   the feature value acquisition unit is configured to acquire a weighted linear combination of the feature values of the parameters, and
   the feature value determination unit is configured to compare the weighted linear combination of the feature values with a predetermined threshold value.

2. The image processing apparatus as claimed in claim 1, further comprising:

an edge detection unit configured to detect edge information from the original pixel values of the image data, the edge information indicating presence of an edge;

wherein the candidate region extraction unit extracts one or more regions each containing contiguous pixels having the edge information as one or more of the candidate regions in the image data having pixel values replaced with the plural representative pixel values.

3. The image processing apparatus as claimed in claim 1, wherein the pixel value replacement unit performs a color clustering process.

4. The image processing apparatus as claimed in claim 1, wherein when the image data are color image data in which each of pixels of the color image data has plural color elements, the pixel value replacement unit quantizes pixel values of the pixels of the color image data for each of the plural color elements and creates a quantized pixel value histogram for each of the plural color elements, the plural representative pixel values are obtained by selecting, from the quantized pixel values, a predetermined number of quantized pixel values that appear more frequently in the quantized pixel value histogram than the remaining quantized pixel values, and each of the pixel values of the image data not being quantized is replaced with one of the plural representative pixel values being closest to said each of the pixel values.

5. The image processing apparatus as claimed in claim 1, wherein the candidate region extraction unit performs extraction of only plural pixels that are adjacent to each other and have the same representative pixel value from the image data in which the original pixel values are replaced with the representative pixel values, and the candidate region extraction unit continues to perform the extraction for the plural candidate regions.

6. The image processing apparatus as claimed in claim 1, wherein the feature value determination unit acquires edge intensity information of each of the candidate regions, letter candidate region accuracy information based on a series of candidate regions having a predetermined separation or less and circumscribed rectangular shape information of each of the candidate regions, and the feature value acquisition unit determines, when the edge intensity information, the letter candidate region accuracy information and the circumscribed rectangular shape information do not satisfy predetermined requirements, that the candidate regions include the drawing-photograph pixels.

7. The image processing apparatus as claimed in claim 1, further comprising:

a symbol pixel determination unit configured to detect, before the original pixel values of the image data are replaced with the plural representative pixel values by the pixel value replacement unit, symbol pixels forming symbols from the image data; and a symbol elimination unit configured to replace, before the original pixel values of the image data are replaced with the plural representative pixel values by the pixel value replacement unit, pixel values of the symbol pixels with adjacent pixel values of pixels adjacent to the symbol pixels, wherein the pixel value replacement unit replaces the pixel values of the image data replaced by the symbol elimination unit with the plural representative pixel values.

8. The image processing apparatus as claimed in claim 7, wherein the symbol pixel determination unit extracts pixel values of identical color connected pixels from pixel values of non-background color pixels determined according to the image data, if a number of the identical color connected pixels is greater than a predetermined threshold number, the symbol pixel determination unit assumes that the identical color connected pixels correspond to a photograph region, and with respect to other identical color connected pixels excluded from the photograph region, the symbol pixel determination unit determines the symbol pixels based on edge intensity information, letter candidate region accuracy information based on a series of candidate regions having a predetermined separation or less, and circumscribed rectangular shape information of the identical color connected pixels.

9. The image processing apparatus as claimed in claim 7, further comprising:

a reduced image formation unit configured to form reduced image data from the image data in which the symbol elimination unit has replaced the pixel values of the symbol pixels, wherein the pixel value replacement unit replaces pixel values of the reduced image data with the plural representative pixel values based on the pixel values of the reduced image data.

10. The image processing apparatus as claimed in claim 1, further comprising:

an integrated drawing-photograph region display unit configured to display an integrated drawing-photograph region of image data on a display unit;

an integrated drawing-photograph cut-out unit configured to cut out the integrated drawing-photograph region from the image data; and an external application association unit configured to transmit the integrated drawing-photograph region to an external document formation unit that forms a new document.

11. An image processing apparatus for extracting, from image data, drawing-photograph pixels forming a drawing or a photograph, the image processing apparatus comprising:

means for replacing original pixel values of image data with plural representative pixel values based on the original pixel values;

means for extracting plural candidate regions, wherein each of the plural candidate regions is formed by a rectangular shape, and includes plural pixels being adjacent to each other and each of the plural pixels has the same representative pixel value;

means for acquiring a feature value of each of a plurality of parameters indicating certainty that symbol pixels forming symbols are contained in each of the plural candidate regions;

means for determining that each of the plural candidate regions in which the symbols are contained based on the feature value does not include the drawing-photograph pixels, and means for integrating other candidate regions that are determined to have the drawing-photograph pixels and have an overlapping part, wherein the means for acquiring is configured to acquire a weighted linear combination of the feature values of the parameters, and the means for determining is configured to compare the weighted linear combination of the feature values with a predetermined threshold value.

12. An image processing method for extracting, from image data, drawing-photograph pixels forming a drawing or a photograph, the image processing method comprising the steps of:

(a) replacing original pixel values of image data with plural representative pixel values based on the original pixel values;

(b) extracting plural candidate regions, wherein each of the plural candidate regions is formed by a rectangular shape, and includes plural pixels being adjacent to each other and each of the plural pixels has the same representative pixel value;

(c) acquiring a feature value of each of a plurality of parameters indicating certainty that symbol pixels forming symbols are contained in each of the plural candidate regions;

(d) determining that each of the plural candidate regions in which the symbols are contained based on the feature value does not include the drawing-photograph pixels, and (e) integrating other candidate regions that are determined to have the drawing-photograph pixels and have an overlapping part, wherein the acquiring step includes acquiring a weighted linear combination of the feature values of the parameters, and the determining step includes comparing the weighted linear combination of the feature values with a predetermined threshold value.

13. The image processing apparatus as claimed in claim 1, wherein the parameters include an edge intensity, a degree of pixels forming letters in pixels of the candidate region, and a size of circumscribed rectangular shape of the candidate region.

14. The image processing apparatus as claimed in claim 13, wherein the weight of the degree of pixels forming letters in pixels of the candidate region parameters is the largest, and the weight of the size of circumscribed rectangular shape of the candidate region is the second largest among the parameters.

* * * * *